United States Patent
McDaniel et al.

(10) Patent No.: US 9,825,463 B2
(45) Date of Patent: Nov. 21, 2017

(54) DEVICES AND SYSTEMS FOR DISTRIBUTED POWER-GRID MONITORING

(71) Applicant: The MITRE Corporation, McLean, VA (US)

(72) Inventors: Sean McDaniel, McLean, VA (US); Peter Weed, McLean, VA (US)

(73) Assignee: The MITRE Corporation, McLean, VA (US)

( * ) Notice: Subject to any disclaimer, the term of this patent is extended or adjusted under 35 U.S.C. 154(b) by 282 days.

(21) Appl. No.: 14/621,136

(22) Filed: Feb. 12, 2015

(65) Prior Publication Data

US 2016/0239010 A1 Aug. 18, 2016

(51) Int. Cl.
G05D 3/12 (2006.01)
H02J 3/00 (2006.01)
H02J 3/38 (2006.01)

(52) U.S. Cl.
CPC .............. *H02J 3/00* (2013.01); *H02J 3/381* (2013.01); *Y02E 60/74* (2013.01); *Y04S 10/30* (2013.01)

(58) Field of Classification Search
CPC .................................................... G06Q 50/06
USPC ........................................................ 700/291
See application file for complete search history.

(56) References Cited

U.S. PATENT DOCUMENTS

| 5,600,527 A | 2/1997 | Engel et al. |
|---|---|---|
| 5,890,097 A | 3/1999 | Cox |
| 6,771,170 B2 | 8/2004 | Papallo, Jr. et al. |
| 6,934,654 B2 | 8/2005 | Benmouyal |
| 8,457,912 B1 | 6/2013 | Wells |
| 8,587,445 B2 | 11/2013 | Rockwell |
| 2003/0101008 A1 | 5/2003 | Hart |
| 2004/0083066 A1 | 4/2004 | Hayes et al. |
| 2005/0017731 A1 | 1/2005 | Zuercher et al. |
| 2006/0187074 A1 | 8/2006 | O'Sullivan et al. |
| 2007/0067678 A1 | 3/2007 | Hosek et al. |
| 2008/0157775 A1 | 7/2008 | Finney |
| 2008/0158753 A1 | 7/2008 | Premerlani et al. |

(Continued)

FOREIGN PATENT DOCUMENTS

| CN | 101625383 | 1/2010 |
|---|---|---|
| CN | 102305889 | 1/2012 |

(Continued)

OTHER PUBLICATIONS

Lu et al, A GPS-free Power Grid Monitoring System over Mobile Platforms, 2015, IEEE, pp. 5.*

(Continued)

*Primary Examiner* — Suresh Suryawanshi
(74) *Attorney, Agent, or Firm* — Morrison & Foerster LLP

(57) ABSTRACT

A device for monitoring the properties of an electrical grid including an electrical connector for coupling to the electrical grid through a wall socket, a detector for detecting at least one property of electricity provided by the electrical grid, a receiver for receiving clock signals, and a sampler for sampling a respective detected property and recording sampled values in a memory, wherein the variation of the values with time represents a waveform of the respective property and the sampler samples at a rate sufficient to record variations of the property within a period of the waveform, wherein the device associates at least a portion of the sampled values with at least one clock signal.

28 Claims, 9 Drawing Sheets

(56) References Cited

U.S. PATENT DOCUMENTS

| | | | |
|---|---|---|---|
| 2009/0062970 A1 | 3/2009 | Forbes, Jr. et al. | |
| 2009/0125158 A1 | 5/2009 | Schweitzer, III et al. | |
| 2009/0281673 A1 | 11/2009 | Taft | |
| 2009/0281679 A1 | 11/2009 | Taft et al. | |
| 2010/0217452 A1* | 8/2010 | McCord | G06Q 50/06 700/295 |
| 2011/0010118 A1 | 1/2011 | Gaarder | |
| 2011/0040786 A1 | 2/2011 | Zhang et al. | |
| 2011/0084672 A1 | 4/2011 | Labuschagne et al. | |
| 2011/0130982 A1* | 6/2011 | Haag | G01R 22/063 702/62 |
| 2012/0033473 A1 | 2/2012 | Scharf | |
| 2012/0166008 A1* | 6/2012 | Jeong | H02J 3/14 700/295 |
| 2013/0120105 A1 | 5/2013 | Bhageria et al. | |
| 2013/0262001 A1 | 10/2013 | Sun et al. | |
| 2014/0058689 A1* | 2/2014 | Klien | H04L 63/14 702/60 |
| 2014/0100705 A1 | 4/2014 | Shi et al. | |
| 2014/0343744 A1* | 11/2014 | Mansfield | H02J 3/14 700/297 |
| 2015/0355249 A1* | 12/2015 | Chanedeau | G01R 23/20 702/75 |
| 2016/0190866 A1* | 6/2016 | Pelletier | B60L 11/1842 307/64 |

FOREIGN PATENT DOCUMENTS

| | | |
|---|---|---|
| CN | 202159086 | 3/2012 |
| CN | 102508082 | 6/2012 |
| CN | 202330589 | 7/2012 |
| CN | 202840471 | 3/2013 |

OTHER PUBLICATIONS

Bose et al, Monitoring and Control of Power Grids: Looking Beyond Reliability Standards, 2003, Power Systems Engineering Research Center, pp. 3.*

Accuenergy Corporation, Acuview User's Guide, Jul. 13 2012, Accuenergy Corporation, pp. 49.*

Hart, G.W. (Dec. 1992). "Nonintrusive Appliance Load Monitoring," *Proceedings of the IEEE*, 80(12): 1870-1891.

Seymour, J. (2011). "The Seven Types of Power Problems," *White Paper 18: Revision 1*: 1-21.

Diouri, M. et al. (2014). "Assessing Power Monitoring Approaches for Energy and Power Analysis of Computers," *Sustainable Computing: Informatics and Systems* vol. 4, pp. 68-82.

* cited by examiner

| DISTURBANCE CATEGORY | WAVE FORM |
|---|---|
| 1. TRANSIENT | |
| IMPULSIVE |  |
| OSCILLATORY |  |
| 2. INTERRUPTIONS | |
| INTERRUPTION |  |
| 3. SAG/UNDERVOLTAGE | |
| SAG |  |
| UNDERVOLTAGE |  |
| 4. SWELL/OVERVOLTAGE | |
| SWELL |  |
| OVERVOLTAGE |  |
| 5. WAVEFORM DISTORTION | |
| DC OFFSET |  |
| HARMONICS |  |
| INTERHARMONICS |  |
| NOTCHING |  |
| NOISE |  |
| VOLTAGE FLUCTUATIONS |  |
| POWER FREQUENCY VARIATIONS |  |

DEVICES AND SYSTEMS FOR DISTRIBUTED POWER-GRID MONITORING

FIELD OF THE INVENTION

The present disclosure relates generally to monitoring electrical grids, and more specifically to small form factor monitoring devices that plug into wall sockets to detect characteristics of electricity provided by an electrical grid.

BACKGROUND OF THE INVENTION

An electrical grid, also referred to as a power grid, is an interconnected network for delivering electricity to consumers. FIG. 1 depicts an example of an electrical grid. A grid may include generating stations that produce electricity, high-voltage transmission lines that carry electricity to demand centers, and distribution lines that connect consumer electronic devices to the grid through wall sockets or other types of electrical outlets.

A "grid" does not imply any physical layout and may refer to an entire electrical network for a given area, country, region, local transmission grid, distribution grid or the like. A so-called "smart grid" can monitor the production and distribution of electricity and uses communications technology to gather and act on analog or digital information in an automated fashion to improve the efficiency, reliability and sustainability of the grid.

Electricity can be monitored at different levels in an electrical grid. For example, a monitoring device at an electrical substation may be used to provide general information about power flow, or a household monitoring device can provide feedback about energy consumption, costs, and estimates of greenhouse gas emissions. Despite developments in monitoring technologies, the ability to effectively and reliably monitor electricity on a grid to detect events and to predict instabilities remains limited due to, for example, aging grid equipment, obsolete system layouts, cost-prohibitive monitoring equipment, insufficient sampling rates and temporal resolutions, and an inability to collect data from a critical number of geographically disparate locations on a grid.

Phasor measurement units (PMUs), also known as synchrophasors, are monitoring devices that provide synchronized measurements of real-time phasors of voltages and currents at respective locations on an electrical grid. A phasor, as defined in more detail below, is a vector representation of a waveform that is commonly used to analyze electrical waveforms carried on an electrical grid. PMUs filter incoming voltage and/or current waveforms through a low-pass filter and often apply a discrete Fourier transform (DFT) algorithm to extract the frequency and phase of the dominant, 60 Hz carrier component, prior to generating phasor measurements. This procedure may result in loss of data about distortions to the incoming waveform, which may not be able to be reconstructed. Specifically, distortions to the waveform that are not associated with the dominant carrier frequency may be lost.

Synchronization of phasor measurements is achieved by using a common time source to sample electrical waveforms at different locations. For example, data about frequency disturbances may be received at a central processing facility from PMUs at different locations on an electrical grid. This data may be used to identify information about electrical anomalies that indicate the state of an electrical grid. However, PMUs are of limited use because they are prohibitively expensive, installed sporadically only at power stations or substations of an electrical grid, and data obtained from PMUs may not include information about short transients and geographically isolated events for making reliable predictions of instabilities.

PMUs are installed at electrical substations to monitor properties, such as voltage and current, of the electricity at the substation and to report the characteristics of the properties to a central monitoring facility where the characteristics of multiple PMUs are analyzed. PMUs monitor and report electrical properties by generating sample measurements of the electrical properties, converting the sampled values into phasors, combining the phasor data with Global Positioning System (GPS) time information, and transmitting the combined data to the central monitor. GPS time information is used as a common time source to synchronize sampled values of electrical waves measured at the various substations on a grid. Phasors are complex numbers that represent a sinusoidal function with time-invariant frequency, phase, and amplitude. They are often represented as vectors on a complex plane with a given phase angle φ and amplitude. Grid instabilities may be determined based on differences between synchronized phasor components.

FIG. 2A depicts a sinusoidal waveform of electricity carried on an electrical grid. The sinusoidal waveform can be represented mathematically as:

$$x(t) = X_m \cos(\omega t + \phi)$$

where $X_m$ is an amplitude, $\omega$ is a frequency in radians per second, $\phi$ is a phase angle in radians, and t is time.

FIG. 2B depicts a phasor representation of the sinusoidal waveform of FIG. 2A. The conversion of the waveform into a phasor can be represented mathematically as:

$$X = \frac{X_m}{\sqrt{2}} e^{j\varphi} = \frac{X_m}{\sqrt{2}} (\cos\varphi + j\sin\varphi)$$

Where, $X_m$ is the peak amplitude, $$\frac{X_m}{\sqrt{2}}$$

is the magnitude of the phasor in R.M.S., and φ is the phase angle. Therefore, a phasor contains information only about the magnitude and phase angle of a waveform. A phasor is only accurate when the frequency of the waveform is constant. What is more, the comparison of two or more phasors assumes that the frequencies of the waveforms represented by the phasors are equivalent. Although a phasor may be converted back into the original waveform, the phasors recorded and reported by PMUs cannot be converted back into the original waveform because information is irreducibly lost during the conversion process.

A PMU measures electrical waves and outputs time-stamped voltage and current phasors based on the measurements. Phasors from different PMUs are compared to assess the static state of a grid and/or to analyze an event that has occurred. For example, a large difference between phase angles measured at different PMUs may imply static stress on a grid. Moreover, a growing phase angle difference may indicate an approaching instability. This occurs because, in general, active (real) power flow is driven by the voltage phase angle difference, called the transmission angle or load angle, between the source and destination in an AC electrical grid. Thus, the larger the phase angle difference between the source and the sink, the greater the power flow between those points. Exceeding a maximum power transfer (indicated by a maximum phase angle) may lead to power grid instability. Thus, e.g., growing phase angle differences may be recorded in the time leading up to an electrical blackout.

FIG. 3 depicts components of a conventional phasor measurement unit (PMU). Again, PMUs are installed at substations and monitor the three phases of a medium or high voltage distribution system and relay extracted phasor information to a central location at low rates (e.g., about 30 Hz). Analog inputs include voltages and currents obtained from secondary windings of the three phase voltage and current transformers located at substations. The analog inputs are processed by an anti-aliasing filter to restrict the bandwidth of a signal to remove input frequencies that are higher than the Nyquist frequency, which is the minimum sampling rate required to avoid aliasing. Often a low-pass filter is set at a low corner frequency (maybe around 200 Hz) to improve the quality and resolution of the converted phasors. This filtering may remove the impulse-like transients and high-frequency components of the original waveform.

A digital decimation filter converts the sampled data to a lower sampling rate to provide a digital antialiasing filter concatenated with the analog antialiasing filter. The analog AC waveforms are digitized by an analog to digital convertor (e.g., 16-bit A/D converter) for each phase. A phase lock oscillator along with a GPS reference source provides the needed high speed synchronized sampling with about 1 µs accuracy. The phasor microprocessor then calculates the phasor using digital signal processing techniques. A network interface can then communicate the phasor data to a central processing receiver that aggregates data from multiple PMUs.

The cost and complex installation of PMUs hinders their widespread adoption. For example, only a few PMUs are typically installed on any grid because their cost can range from $30,000 to $40,000 each. Consequently, PMUs and similar devices may provide data that is sparse and of limited use because PMUs are installed at limited preselected substations on a grid, collect data at low rates, and convert original waveforms to phasors often representing the behavior of only the carrier frequency.

The frequency monitoring network (FNET) project, developed at the University of Tennessee, Knoxville, is another system used for monitoring an electrical grid. The FNET project uses a series of low-cost, distributed devices that sample at 1.44 kHz. Similar to PMUs, the FNET devices are limited to calculating and relaying phasor information at 10 Hz.

Another monitoring device is the imc DataWorks Climate Retrieval and Observations Network of the Southeast (CRONOS) flex/C-Series that are able to capture and save multiple channels of waveform data to disk at high sampling rates with reference to a GPS clock. These devices may be combined with an external networked computer system and current clamps to measure properties of an electrical grid. However, this setup is complicated, very expensive, involves multiple vendors and hardware products, and is prone to error.

Another monitoring device includes Libelium Waspmote, which is a general purpose, microprocessor driven hardware platform for experimental applications Like the CRONOS system, these devices offer a general purpose platform that require external hardware components to measure properties of an electrical grid. Moreover, these devices sample at low rates that is insufficient for many analysis tasks that would be useful for detecting a vast array of different types of anomalies occurring on an electrical grid.

Yet another monitoring device is Power Standards Lab's PQube, which is a power quality and event monitor. This device detects events and provides a wealth of information about the events. However, installation is complex, expensive and requires a licensed electrician. Moreover, these devices are event detectors that can provide waveform information only centered on an event. These devices do not continuously capture waveform data.

Accordingly, there is a need for a compact, easy to install, high-fidelity, and low-cost monitoring device that collects data about household-level electrical waveforms. The device should be easy to operate and improve monitoring of an electrical grid by facilitating post-event analysis, adaptive protection, state estimation, and pattern recognition to detect potential events or instabilities. Effective utilization of this technology should be useful to mitigate blackouts and to learn about the real-time behavior of an electrical grid.

SUMMARY OF THE INVENTION

The disclosed methods, systems and devices can be used to monitor an electrical grid by collecting information at multiple locations that are each coupled to the electrical grid. Each monitoring device may be connected through a household wall socket to the grid to collect data about characteristics of electricity provided by the grid. A central facility can then aggregate data collected by the multiple monitoring devices at respective locations on the grid. The aggregated data can then be analyzed to assess the state of a region of the grid. In some embodiments, the monitoring device has a small form factor, is low-cost, is easy to install by plugging into a wall socket, and is easy to use by laypersons.

Monitoring devices described herein are capable of capturing, in real-time, full waveforms of voltage and/or current from low-voltage endpoints for versatile data analysis, in a low cost, easy-to-operate package with a small form factor. Unlike existing devices used for monitoring an electrical grid such as PMUs, event monitors, and frequency disturbance recording devices, the disclosed monitoring devices record full waveforms by sampling at higher rates, which enables the capture of characteristics of the electricity provided by an electrical grid. Additionally, the disclosed monitoring devices may collect data of low-level voltages, such as household voltage, which can be used to determine the state of a grid at a particular location. Furthermore, certain embodiments may associate collected waveform data with time stamps and location information, which allows the waveform data to be tagged with time and location data. Some embodiments also collect auxiliary data from connected auxiliary monitoring devices and associate the auxiliary data with time stamps and location information. In some embodiments, monitoring devices include the ability to monitor the electrical characteristics of the voltage and/or current drawn by an attached appliance.

Monitoring systems described herein may receive waveform data from monitoring devices installed throughout an electrical grid and aggregate the data to determine the state of a region of the grid. Monitoring systems may use GPS time and location information associated with waveform data for aggregation and analysis. In certain embodiments, another synchronized time source (e.g., Network Time Protocol, Precision Time Protocol, etc.) is used to associate with waveform data. Unlike existing devices and systems, disclosed systems may be capable of pinpointing the location of a characteristic, feature, instability, disturbance, or the like down to the level of a household or business where a disclosed monitoring device is installed.

Unlike existing devices, methods, and systems for monitoring an electrical grid that rely on measurements of the amplitude and phase of electricity carried through substations in the form of "phasors" and report the measurements at low frequency, usually around 30 Hz, the disclosed monitoring devices may collect and report electrical property measurements such as voltage and current at much higher rates, without conversion to phasors. Thus, the disclosed devices provide the full-voltage or current waveform information of the monitored electricity instead of limited representations of voltage and current behavior represented in phasors collected and transmitted at 30 Hz. Furthermore, unlike many existing monitoring devices, methods, and systems that are only installed at high or medium voltage substations and thus do not provide information about low-voltage points on the electrical grid, the disclosed monitoring device can be plugged into a standard household or business electrical wall socket to collect information about the state of the electrical grid at that low-voltage locale. As a result, the disclosed monitoring devices can collect and transmit high fidelity voltage and current waveform information from low voltage endpoint locations to one or more central processing facilities, where collected data can be aggregated and analyzed to monitor a region of an electrical grid.

The disclosed monitoring devices may sample full waveforms of voltage and/or current in real-time from a low-voltage source coupled to an electrical grid, through a conventional outlet such as a wall socket. The sampled data may be associated with a time stamp to facilitate aggregation of data from multiple monitoring devices distributed on an electrical grid. One or more remotely located central processing facilities may collect the sampled data from the multiple monitoring devices on the electrical grid. By providing full waveforms of voltage and/or current in real-time from a standard outlet, the disclosed monitoring devices provide the ability to monitor the characteristics of an electrical grid based on more data points per unit time to reveal grid performance, detect events, anomalies, and disturbances, and determine stability at various levels of granularity that are not possible with existing devices.

In some embodiments, the disclosed monitoring devices can have a small form factor and be relatively inexpensive. Accordingly, suppliers or consumers can afford to purchase and use a greater number of monitoring devices to allow for collecting more information from more locations on a grid. Consequently, not only do the disclosed monitoring devices provide improved qualitative data, they can also provide substantially more sources of data when used by a greater number of consumers, which allows improved analytics about an electrical grid.

In some embodiments, applications of the disclosed methods, systems and devices include, but are not limited to, extracting state space information such as state values of features of an electrical grid, measuring dynamic behavior, mapping an electrical grid network, detecting disturbances, gathering network parameters, monitoring a regional or national electrical grid, measuring grid stress, analyzing and mitigating disaster events, predicting power outages, estimating power quality, and the like.

In some embodiments, the disclosed monitoring device includes an electrical connector for coupling to the electrical grid through a wall socket, a detector for detecting at least one property of electricity provided by the electrical grid, a receiver for receiving clock signals, and a sampler for sampling a respective detected property and recording sampled values in a memory, wherein the variation of the values with time represents a waveform of the respective property and the sampler samples at a rate sufficient to record variations of the property within a period of the waveform, and wherein the device associates at least a portion of the sampled values with at least one clock signal.

In any of the embodiments described, the electrical connector of the monitoring device may be wall socket plug. In some embodiments, the monitoring device detects voltage and current. In any of the embodiments described, the sampling rate of the monitoring device may be sufficient to capture at least one disturbance in the waveform of the respective property in the recorded sampled values. In any of the embodiments described, the sampling rate of the monitoring device may sufficient to capture at least one transient disturbance with a duration less than the period of the waveform of the respective property. In any of the embodiments described, the at least one disturbance may have a frequency. In any of the embodiments described, the waveform of a respective property may have a nominal frequency and the frequency of the at least one disturbance may be greater than the nominal frequency. In any of the embodiments described, the frequency of the at least one disturbance may be greater than 15 Hz. In any of the embodiments described, the at least one disturbance may be a distortion of the waveform. In any of the embodiments described, the distortion may be a DC offset, a harmonic, an interharmonic, a noise, or a notching.

In any of the embodiments described, the sampling rate of the disclosed monitoring device may be at least 5 kilo-samples-per-second (ksps) or at least 50 ksps.

In any of the embodiments described, the sampler of the monitoring device may be a component of an application-specific integrated circuit (ASIC).

In any of the embodiments described, the monitoring device may include a communication receiver for receiving instructions to program the rate of the sampler. In some embodiments, the monitoring device may include a transmitter configured to transmit data to a remote server, a client device, or a mobile device. In any of the embodiments described, the transmitter may be configured to transmit wirelessly to the remote server, the client device, or the mobile device over a communication network. In any of the embodiments described, the transmitter may be a Wireless Fidelity (Wi-Fi) or a Bluetooth transmitter. In any of the embodiments described, the transmitter may transmit at least a portion of the sampled values associated with the at least one clock signal in real-time to the remote server.

In any of the embodiments described, the memory may be removable from the device. In any of the embodiments described, the memory may be configured to store sampled data over a period of at least one hour.

In any of the embodiments described, the monitoring device may include a rechargeable battery. In any of the embodiments described, the monitoring device may be designed to be supported by the wall socket. In any of the embodiments described, the monitoring device may be configured to operate without further action by a user after coupling to the electrical grid through the wall socket.

Described herein is a system for monitoring an electrical grid. In some embodiments, the system includes a plurality of portable devices configured to connect to a plurality of respective wall sockets connected to an electrical grid, wherein each of the plurality of portable devices includes an electrical connector for coupling to the electrical grid through a wall socket, a detector for detecting at least one property of electricity provided by the electrical grid, a receiver for receiving clock signals, and a sampler for sampling a respective detected property and recording sampled values in a memory, wherein the variation of the values with time represents a waveform of the respective property and the sampler samples at a rate sufficient to record variations of the property within a period of the waveform, wherein each of the plurality of portable devices associates at least a portion of the sampled values with at least one clock signal, and a server that communicates over a network with each of the plurality of portable devices to receive at least a respective portion of the sampled values associated with the at least one clock signal.

In any of the embodiments described, the system may aggregate received sampled values and associated clock signals by using the associated clock signals as markers to compare the sampled values received from one of the plurality of portable devices with the sampled values received from the others of the plurality of portable devices.

In any of the embodiments described, the system may detect a feature of the electrical grid by analyzing the aggregated sampled values. In any of the embodiments described, the system may determine an area of the electrical grid affected by the feature. In any of the embodiments described, the system may determine a location affected by the feature within the area of the grid. In any of the embodiments described, the system may detect the feature within a low voltage portion of the electrical grid.

Disclosed is a method for monitoring the properties of an electrical grid including receiving electricity from the electrical grid through a wall socket, detecting at least one property of electricity provided by the electrical grid, receiving at least one clock signal, sampling a respective detected property and recording sampled values in a memory, wherein the variation of the values with time represents a waveform of the respective property and the sampler samples at a rate sufficient to record variations of the property within a period of the waveform, and associating at least a portion of the sampled values with at least one clock signal.

DETAILED DESCRIPTION OF THE INVENTION

Figure 1:
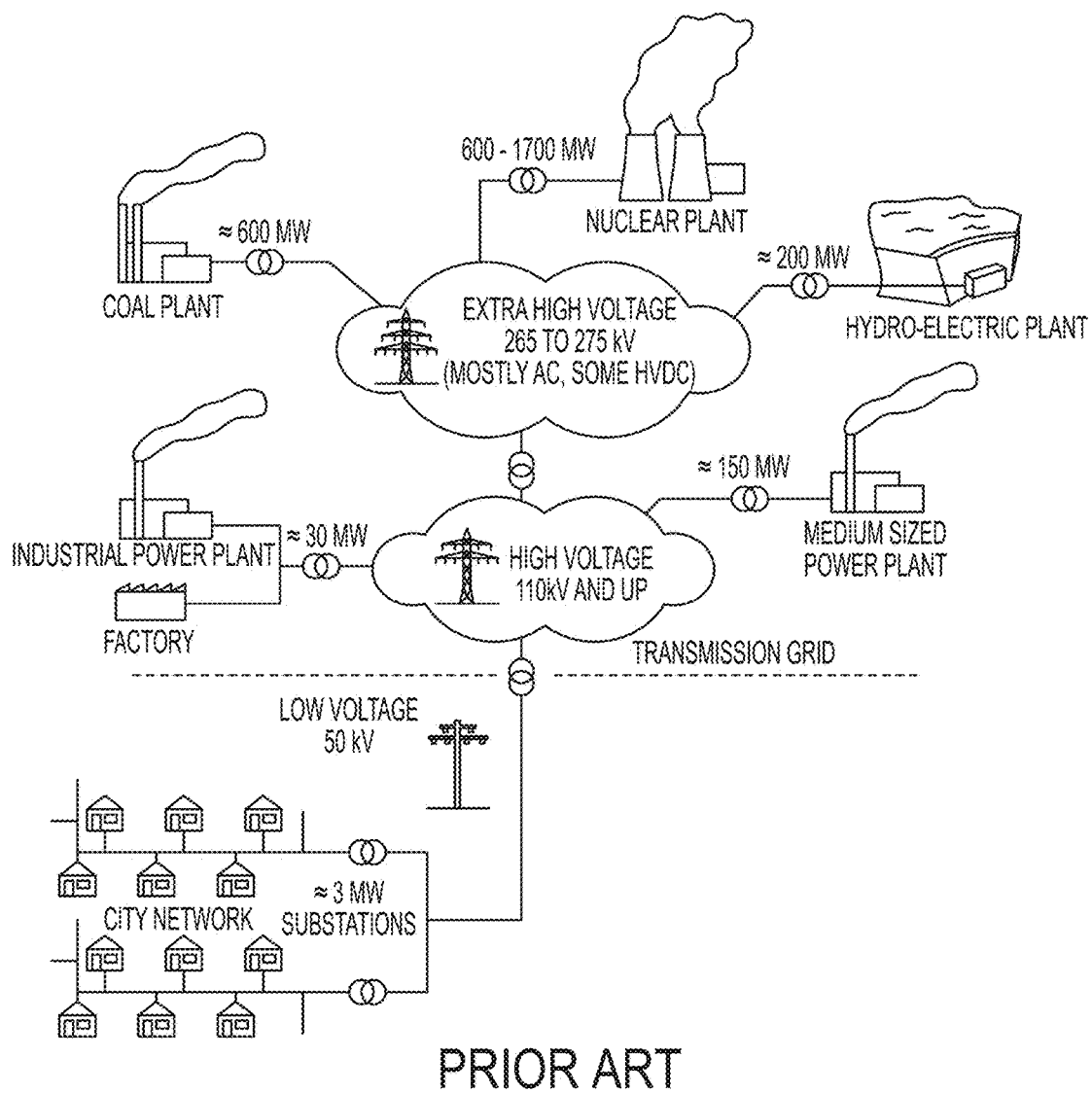
FIG. 1 depicts a conventional layout for an electrical grid.
Figure 2A:
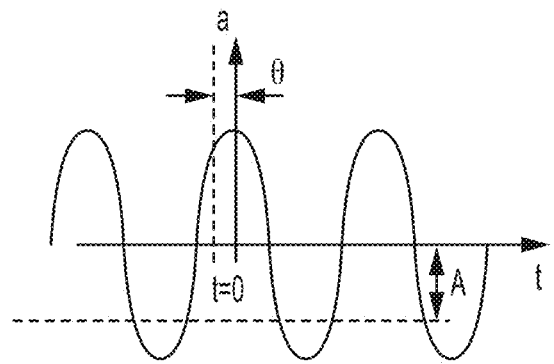
FIG. 2A depicts a sinusoidal waveform of electricity carried on an electrical grid.
Figure 2B:
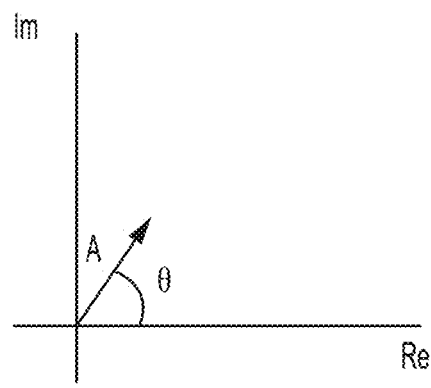
FIG. 2B depicts a phasor representation of the sinusoidal waveform of FIG. 2A
Figure 3:
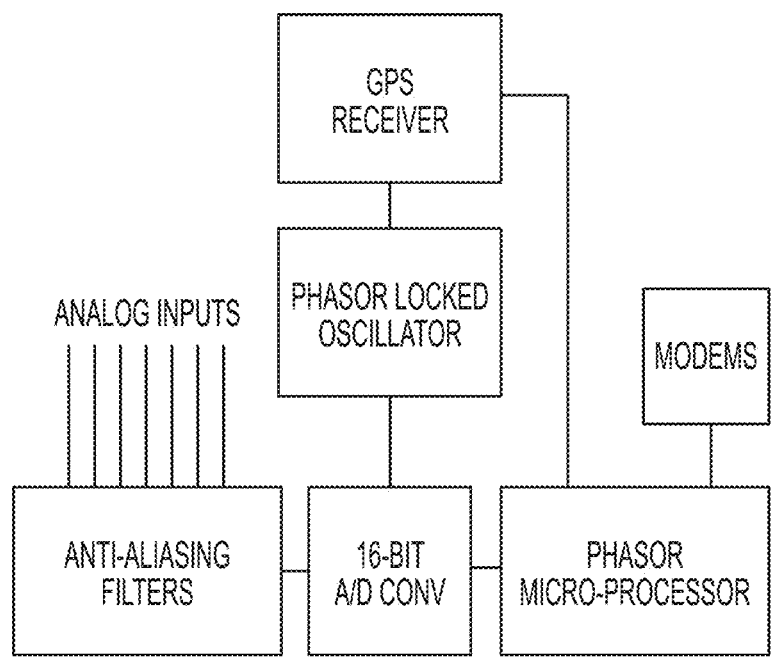
FIG. 3 depicts components of a conventional phasor measurement unit (PMU).

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Embodiments of an electrical grid monitoring system, device, components for such a device, and associated processes for using such a device are described herein.

The disclosed methods, systems, and devices can be used to monitor an electrical grid by collecting information at multiple locations coupled to the electrical grid. Disclosed monitoring devices may be connected through a household wall socket to the grid to collect data about characteristics of electricity provided by the grid at the installed locations. One or more central facilities can then aggregate data collected by the multiple monitoring devices at respective locations on the grid. The aggregated data can then be analyzed to assess a region of the grid. In some embodiments, the monitoring device has a small form factor, is low-cost, is easy to install by plugging into a wall socket, and is easy to use by laypersons.

Monitoring devices described herein are capable of capturing, in real-time, full electrical property information, e.g. voltage and current information, from low-voltage endpoints for versatile data analysis, in a low cost, easy-to-operate package with a small form factor. Unlike conventional devices used for monitoring an electrical grid, such as PMUs, the disclosed monitoring devices record full waveforms of voltage and/or current by sampling at much higher rates, enabling the capture of characteristics of the electricity provided by an electrical grid that are not captured by PMUs and other similar devices and systems. Also unlike many existing devices, the disclosed monitoring devices may collect data of low-level voltage locations, such as household voltage, which can be used to determine the state of a grid at a particular location, neighborhood, sub-grid, or other relatively small region of the grid whereas existing devices and systems typically measure electrical properties at high voltage substations. Disclosed monitoring devices can transfer the collected data to one or more central processing facilities, which aggregate data from multiple monitoring devices enabling analysis not available with conventional systems.

One advantage of capturing, recording, and transmitting full waveforms of electrical properties according to the disclosed monitoring devices, systems, and methods is to enable analysis on a richer data set. The data set is richer in that the full waveforms are lossless representations of the amplitudes of the electrical properties over time. In contrast, many conventional devices, such as PMUs, filter out content from the electrical property waveforms in order to focus on certain components, such as the dominant carrier frequency. The removed content is unrecoverable. By capturing, recording, and transmitting full waveforms, content is not removed, thus enabling analysis of, for example, non-dominant components of the electrical properties. The data set is also richer in that it contains an increased number of measurement points per unit time, due to the higher sampling rates according to certain embodiments. This enables the capturing, recording, and transmitting of higher frequency behaviors and behaviors of shorter duration. Analyses available on such richer data sets may not be available on datasets created using existing systems based on frequency and phasor data reporting. Although frequency and phasor measurements have long been considered the most important quantities in grid monitoring, many issues related to power delivery and power quality characteristics are not reflected in frequency and phasor data (e.g., impulsive and oscillatory transients and harmonic distortions). Such frequency and phasor data may be insufficient to detect many phenomena, or disturbances, that affect electrical power grids. In contrast, the disclosed monitoring devices can capture such phenomena because they can capture, record and transmit full waveforms of electrical properties at much higher rates.

Furthermore, disclosed monitoring devices are low-cost, easy to install by plugging into wall sockets, and easy to use by laypersons enabling wide adoption and wider installation than conventional systems. Disclosed monitoring devices are compact and may be small enough to be supported by a common outlet plug. Disclosed monitoring devices monitor full electrical waveforms in a single-unit construction. No additional components may be necessary to interface the monitoring device with the electrical grid or external environment (e.g. cables, voltage downscaling, etc.). Disclosed monitoring devices may be installed at household and businesses enabling the detection and analysis of the state of the electrical grid at the installed locations. This type of resolution is unavailable in conventional systems such as those based on PMUs. For example, because of the cost and complexity of PMUs, relatively few are installed and only at the substation level of a larger electrical grid. The state of electricity downstream of a substation with an installed PMU, at a household, business, or part of a neighborhood, for example, may be undetectable by the PMU. Many types of disturbances or other phenomena affecting a region downstream of a substation may not be communicated over the electrical grid to the substation. For example, a transformer separating households or businesses from a substation may filter certain disturbances, such as transients and high frequency signals, preventing them from being communicated to the substation. However, it may be at the end-user where the state of the electricity is most important. Because the disclosed devices are installed at the end-user, the state of the electrical grid at the installed location is recorded and available for analysis.

Figure 9:
FIG. 9 depicts a summary of examples of electrical grid distortions.
Figure 9:
Figure 9:
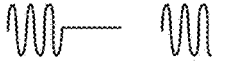
Figure 9:
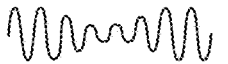
Figure 9:
Figure 9:
Figure 9:
Figure 9:
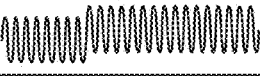
Figure 9:
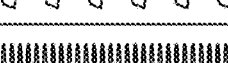
Figure 9:
Figure 9:
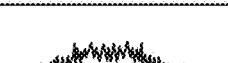
Figure 9:
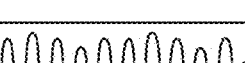
Figure 9:
Figure 9:

Examples of disturbances that may be captured by embodiments of the disclosed monitoring devices according to the present invention include transients, interruptions, sags, swells, waveform distortions, voltage fluctuations, and frequency variations. A summary of these disturbances is depicted in FIG. 9 and described below. Disturbances may affect the current, the voltage, or both of the electricity in the electrical grid. The disturbances described below are but a few of the possible disturbances that may affect an electrical grid provided by way of example only. Many of these disturbances are undetectable by conventional systems that are based on frequency and phasor measurements and are sparsely dispersed.

Transients may be either impulsive or oscillatory. Impulsive transients are sudden high peak events that raise the voltage and/or current levels in either a positive or a negative direction. Impulsive transients can be very fast events (e.g., 5 nanoseconds rise time from steady state to the peak of the impulse) of short-term duration (e.g., less than 50 nanoseconds). An impulsive transient is often referred to as a surge or a spike. Different terms, such as bump and glitch, are also used to describe impulsive transients. Causes of impulsive transients include lightning, poor grounding, the switching of inductive loads, and electrical utility fault clearing. Some embodiments may capture these types of transients because of high sampling rates that result in the sampling and recording of multiple measurements within the duration of a transient. Some embodiments can capture impulsive transients of less than 50 nanoseconds in duration. Some embodiments can capture impulsive transients of less than 50 microseconds in duration.

Oscillatory transients are sudden changes in the steady-state condition of a signal's voltage and/or current, oscillating at a natural system frequency. The transient causes the power signal to alternately swell and then shrink. Oscillatory transients may decay to zero within a cycle, a decaying oscillation, or last longer than a cycle. These transients may occur when an inductive or capacitive load, such as a motor or capacitor bank, is shut off. A long electrical distribution system can act like an oscillator, causing an oscillatory transient, when power is switched on or off, because all circuits have some inherent inductance and distributed capacitance that briefly energizes in a decaying form. When oscillatory transients appear on an energized circuit, usually because of utility switching operations, they can be quite disruptive. Disclosed monitoring devices according to the present invention can capture oscillatory transients because the higher sampling rates enable recording of multiple measurements of an oscillating property within the duration of the behavior, which may last less than a cycle of the fundamental frequency (also known as the baseline frequency, nominal frequency, or carrier frequency).

Interruption is defined as the complete loss of supply voltage or load current. Depending on its duration, an interruption is categorized as instantaneous (0.5 to 30 cycles), momentary (30 cycles to 2 seconds), temporary (2 seconds to 2 minutes), or sustained (greater than 2 minutes). The causes of interruptions may be the result of some type of electrical supply grid damage, such as lightning strikes, animals, trees, vehicle accidents, destructive weather (high winds, heavy snow or ice on lines, etc.), equipment failure, or a basic circuit breaker tripping. Disclosed monitoring devices, systems, and methods according to the present invention may detect an interruption even of the instantaneous category, again, because of the higher sampling and recording rates. In contrast, a PMU may be unable to detect or communicate an instantaneous interruption. For example, a PMU reporting at a typical 30 phasors per second would report one sample every two cycles of 60 Hz (60 cycles per second) electricity, which would be unable to communicate an interruption lasting 0.5 cycles.

Sag is a reduction in AC voltage at a given frequency for the duration of 0.5 cycles to 1 minute (360 cycles on a 60 Hz system). Sags are usually caused by system faults, and are also often the result of switching on loads with heavy startup currents. Common causes of sags include starting large loads and remote fault clearing performed by utility equipment. Similarly, the starting of large motors inside an industrial facility can result in significant voltage sag. Creating a large and sudden electrical load may cause a significant voltage drop to the rest of the circuit it resides on. Swell is an increase in AC voltage for a duration of 0.5 cycles to 1 minute. Examples of sources of swells are high-impedance neutral connections, sudden and large load reductions, and a single-phase fault on a three-phase system. Like interruptions, sags and swells may be undetectable or not communicated by phasor-based systems. Additionally, sags caused by a load at an end-user may affect other users within the area of the electrical grid but may not affect the electricity at the substation feeding the region containing the area, meaning that a phasor-based system installed at the substation would not detect the disturbance.

Another category of disturbances affecting an electrical grid that are detectable by disclosed monitoring devices according to the present invention are waveform distortions. A waveform distortion is a change from the ideal or nominal sinusoidal waveform that is generally not transient. There are five primary types of waveform distortion: DC offset, harmonic distortion, interharmonic distortion, notching, and noise.

Direct current (DC) can be induced into an AC distribution system, often due to failure of rectifiers within the many AC to DC conversion technologies in modern equipment. DC can traverse the AC power system and add unwanted current to devices already operating at their rated level. Overheating and saturation of transformers can be the result of circulating DC currents. When a transformer saturates, it not only gets hot, but also is unable to deliver full power to the load, and the subsequent waveform distortion can create further instability.

Harmonic distortion is the corruption of the fundamental or nominal waveform at frequencies that are multiples of the fundamental or nominal frequency of the waveform (also known as the carrier frequency). In a harmonic distortion, every cycle of the waveform is distorted equally. Symptoms of harmonic distortion include overheated transformers, neutral conductors, and other electrical distribution equipment, as well as the tripping of circuit breakers and loss of synchronization on timing circuits that are dependent upon a clean sine wave trigger at the zero crossover point. Harmonic distortions that originate in one location of the power grid may flow through the power grid causing high frequency voltage drops that modify the voltage waveform at nearby locations.

Interharmonics are a type of waveform distortion that are usually the result of a signal imposed on an electrical grid voltage by electrical equipment such as static frequency converters, induction motors, and arcing devices. Cycloconverters (which control large linear motors used in rolling mill, cement, and mining equipment), create some of the most significant interharmonic problems. These devices transform the supply voltage into an AC voltage of a frequency lower or higher than that of the fundamental frequency.

Notching is a periodic voltage disturbance caused by certain devices, such as variable speed drives and arc welders under normal operation. Notching could be described as a transient impulse distortion, but because the notches are periodic over each half cycle, notching is considered a waveform distortion problem.

Noise is unwanted voltage or current superimposed on the electrical grid voltage or current waveform. Noise can be generated by power electronic devices, control circuits, arc welders, switching power supplies, radio transmitters and so on. Poorly grounded sites make an electrical grid more susceptible to noise.

As with transients, interruptions, sags, and swells, waveform distortions are detectable by disclosed monitoring devices because of the higher sampling and recording rates used by the monitoring devices and the capture of full waveform data. Such high sampling and recording rates enable the analysis of full electrical property (e.g., voltage and/or current) waveforms captured in the recorded data. Many of these waveform distortions would be undetectable by phasor based systems, as discussed above. Furthermore, where a waveform distortion affects an area within a region served by a substation and a monitoring system at a substation is relied upon to monitor the electricity delivered to the region, the waveform distortion may be undetectable regardless of the sampling, recording, or reporting method used at the substation.

Other categories of disturbances that certain embodiments are able to capture are voltage fluctuation and frequency variation. Voltage fluctuation is a systematic variation of the voltage waveform or a series of random voltage changes, of small dimensions, namely 95% to 105% of nominal at a low frequency, for example, below 25 Hz. A load exhibiting significant current variations can cause voltage fluctuations. Arc furnaces are a common cause of voltage fluctuation on the transmission and distribution system. Frequency variation is a steady state change in the nominal frequency of the electricity. Frequency variations may cause a motor to run faster or slower to match the frequency of the input power. This would cause the motor to run inefficiently and/or lead to added heat and degradation of the motor through increased motor speed and/or additional current draw. Even where conventional systems may be able to detect and report voltage fluctuation and frequency variation, such disturbances that affect only a small area within a region fed by a substation are undetected by conventional systems. In contrast, disclosed monitoring devices according to the present invention are installed at the end-user—households and businesses—and therefore, are able to detect and report such disturbances affecting such small areas.

Disturbances such as these are often not detectable by electrical grid operators relying on conventional phasor and frequency measurement systems because such systems do not sample at a high enough rate to detect transient events (i.e., such systems have low temporal resolution), because transient events are averaged away (e.g., PMUs may sample at several kHz but only report averaged phasor data at 10 kHz), because the method of converting data to a phasor eliminates transients (through low-pass filtering and Discrete Fourier Transform extraction of the dominant frequency), and because measurement points are located too far from the epicenter of an event (i.e., such systems have a relatively few number of sensors). For example, where a measurement unit is installed at a substation but the disturbance is within an area fed by a transformer downstream of the substation, the disturbance may be undetectable upstream of the transformer but may affect each household or business fed by the transformer.

The described monitoring device, the described systems based on such devices, and the described methods of monitoring used by such devices according to the present invention improve on conventional systems, methods and devices because they are relatively inexpensive, facilitating widespread adoption, easy to use and install by plugging into household wall sockets, and provide richer data about characteristics of electricity on a grid by capturing full waveforms of electrical properties and by sampling at higher rates. Furthermore, certain embodiments, are low-powered with built-in battery backup that enables persistent data collection through outages (full event capture), and offer flexible installation (e.g., interchanged plugs to monitor different circuits and interchangeable antennas to improve GPS signal availability or minimize device footprint. Consequently, the amount of data acquired at higher resolutions and in more locations can be used to determine characteristics of electricity at dispersed locations on the electrical grid, including the presence of disturbances, as well as to make predictive calculations about instabilities with a higher degree of granularity. Thus, for example, use of the disclosed monitoring devices can increase the likelihood of identifying an impending electrical blackout to warn consumers and/or for suppliers to make adjustments to the grid to avoid the blackout.

Furthermore, described monitoring devices may be low-powered with built-in battery backup that enables persistent data collection through power outages (full event capture). Described monitoring devices may also allow flexible installation through interchangeable plugs that can be interchanged to monitor different circuits (e.g. 120V/240V and the various types of plugs for each) and interchangeable antennas that improve GPS signal availability (e.g., patch antenna) or minimize device footprint (e.g., quad helix antenna).

I. Monitoring Method

Described herein are monitoring methods for monitoring an electrical grid by collecting information at multiple locations coupled to the electrical grid. Disclosed monitoring methods sample and record measurements of electrical properties of the electricity provided by the electrical grid. The methods capture, in real-time, full electrical property, e.g. voltage and current, information from low-voltage endpoints for versatile data analyses. Unlike existing methods used for monitoring an electrical grid such as those based on frequency and phasor measurements, the disclosed monitoring methods record full waveforms of electrical properties, such as voltage and current, by sampling at higher rates, enabling the capture of characteristics of the electricity provided by an electrical grid that are not captured by many conventional methods. Also unlike existing methods, the disclosed monitoring methods enable collection of data of low-level voltage locations, such as household voltage, which can be used to determine the state of a grid at the particular low-level voltage location, whereas existing methods typically measure electrical properties at high voltage substations.

Disclosed monitoring methods associate collected data with GPS clock signals and transfer the data to one or more central processing facilities, which aggregate data from multiple monitoring devices enabling analyses not available with conventional systems. Consequently, the analyzed data can be used to determine characteristics of electricity at dispersed locations on the electrical grid, including the presence of disturbances, as well as to make predictive calculations about instabilities with a higher degree of granularity. The full waveform data collected from dispersed locations according to the disclosed methods, may enable an operator to identify an area affected by a detected feature and to pinpoint a location of a cause of the feature.

According to certain embodiments, electricity is received from an electrical grid through a wall socket. Properties of the electricity are detected. For example, current and/or voltage may be detected. The detected properties are sampled and recorded to represent a waveform of a respective property. The sampling rate of disclosed monitoring devices is sufficient to record variations of the waveform within a period of the waveform. In some embodiments, GPS clock signals are received and associated with the sampled and recorded values to enable synchronization of the values with other recorded values.

The recorded and associated data is transferred to one or more central processing facilities for further processing. The one or more central processing facilities may aggregate the data, which includes sampled values and associated GPS clock signals, using the GPS clock signals as markers to synchronize or compare received data from multiple collection points. According to certain embodiments, the aggregated data is analyzed to detect features (any properties of a waveform—e.g., transient, dip, etc.—that deviate from nominal conditions) of the electrical grid and to determine affected locations. In some embodiments, an affected location can be a single household or business. In some embodiments, the location is a low-voltage sub-region of an electrical grid that is supplied by a low voltage transformer. In some embodiments, the sub-region is a region supplied by one or more substations.

In some embodiments of the disclosed monitoring methods, one or more central processing facilities are able to pinpoint multiple sub-regions that were affected by a detected feature at the same time based on location information associated with monitoring data received from particular monitoring devices. In some embodiments, one or more central processing facilities are able to determine the time that a detected feature occurred based on the time information included in the monitoring data received from monitoring devices. In some embodiments, one or more central processing facilities are able to predict the occurrence of a feature by analyzing received data by, for example, correlating time and location data with full waveform data from various monitoring devices.

Figures 4A, 4B:
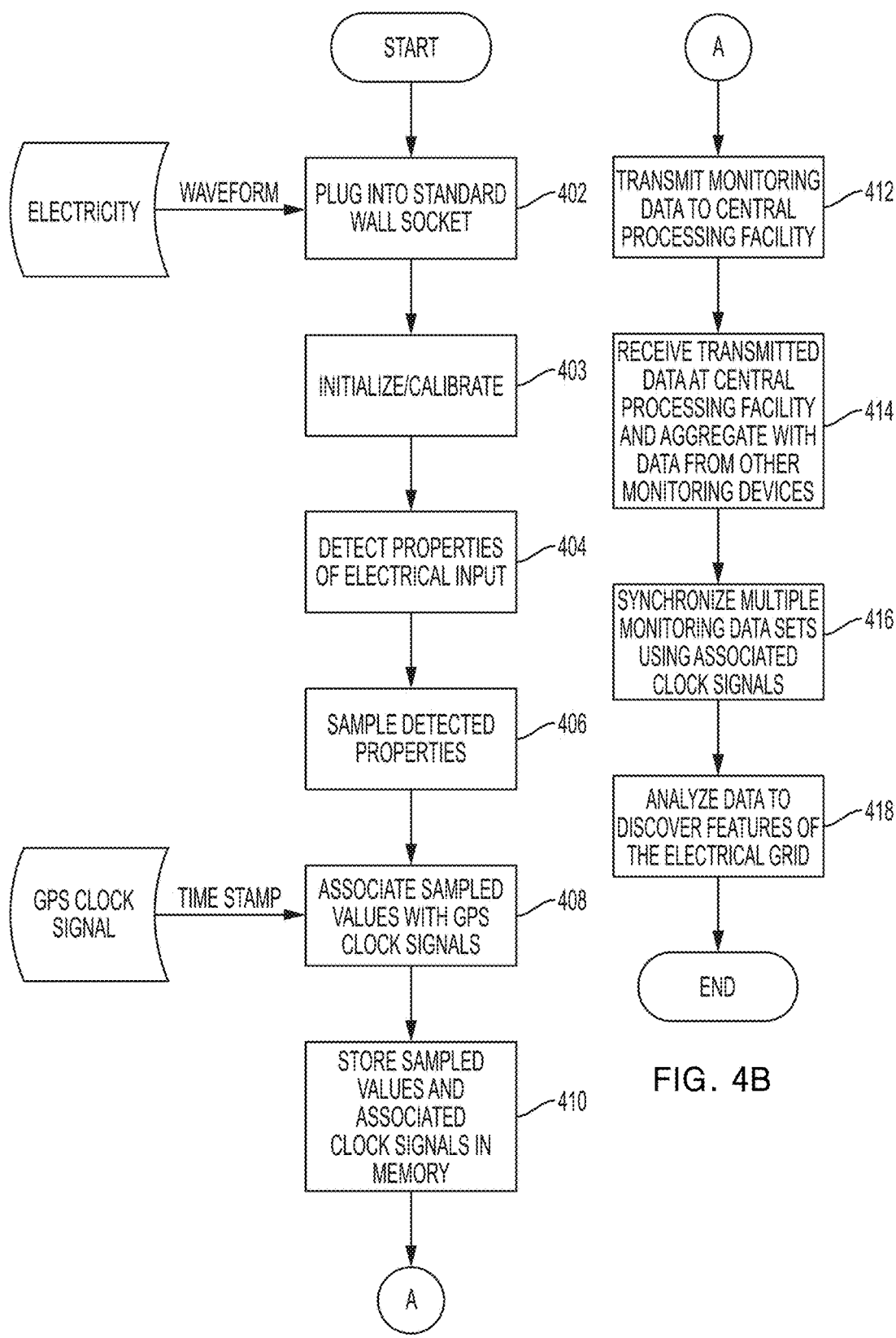
FIGS. 4A and 4B are flow diagrams illustrating a process of capturing a full waveform from an electrical grid through an electrical wall socket according to some embodiments.
Figure 5:
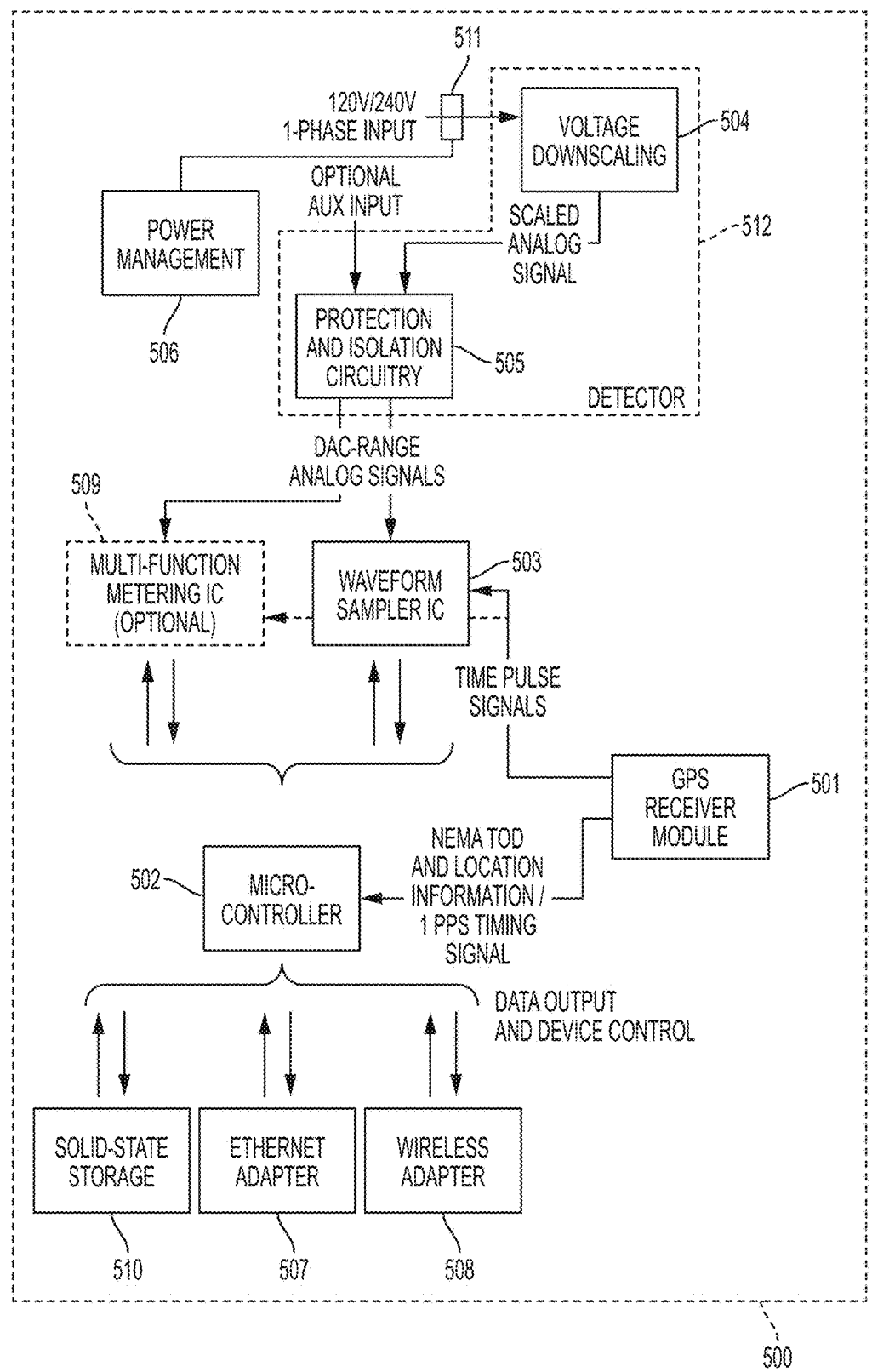
FIG. 5 depicts components of the disclosed monitoring device according to some embodiments.

FIG. 4 is a flow diagram illustrating an embodiment of the disclosed method for monitoring the properties of electricity carried over an electrical grid to a location. Reference is made to the components of FIG. 5 to illustrate the process in the context of the structural components of a monitoring device. FIG. 5 depicts monitoring device 500 that includes a combination of components, such as connector 511, detector 512, sampler 503, receiver 501, and microcontroller 502. Examples of each component and their structural relationship are detailed further below.

At step 402, monitoring device 500 is plugged into a standard household wall socket. Connector 511 of monitoring device 500 is formed of conductive material that is used to couple to an electrical grid through the wall socket.

Monitoring device 500 may be powered by AC power from the electrical grid through the wall socket and/or may be powered by DC power from a battery located within monitoring device 500. For example, the battery may be a rechargeable battery and power from the grid may be used to charge the battery during certain periods, and the charged battery may be used to monitor the grid at other times. This would allow the monitoring device 500 to continue recording through blackouts, brownouts, and other temporary outages, ensuring uninterrupted data acquisition.

Monitoring device 500 may activate automatically when plugged in or manually through a physical switch or a separate computing device in communication with monitoring device 500. For example, a user may activate monitoring device 500 manually through a software application executing on a smartphone that communicates with the device using a wireless signal, e.g. over a wireless local area network (WLAN) such as Wi-Fi.

One of many monitoring modes may be set for monitoring device 500 to monitor for a particular period of time or to monitor continuously. In some embodiments, a monitoring mode may be programmed to measure waveform data for a period measured in minutes, for example less than 10 minutes, less than 5 minutes, and/or less than 2 minutes. In some embodiments, a monitoring mode may be programmed to collect waveform data for a period measured in seconds, for example less than 45 seconds, less than 30 seconds, and/or less than 15 seconds. In some embodiments, an operator or user of monitoring device 500 may be given an option to select a particular period from a plurality of choices to accommodate for types of analysis. In some embodiments, an operator or user of monitoring device 500 may be able to enter any customized period before the beginning of a monitoring session via a keyboard input, mouse input, touchscreen input, voice command, or the like. In some embodiments, the monitoring period may be adjustable before and/or during the monitoring session to accommodate for differences in conditions on a grid.

At step 403, monitoring device 500 may initialize and/or calibrate prior to recording waveform data. The initialization or calibration may occur by reference to internally stored data, by receiving commands from an external source, or by obtaining information from the electricity receives through the plug. For example, monitoring device 500 may detect that the electrical signal intensity is too high and may reduce certain parameters, such as gains, in response.

At step 404, detector 504 detects properties of electrical inputs from the electrical grid through the wall socket. The properties may include, for example, AC waveforms such as voltage and current waveforms based on a 115-240 volts root-mean-squared (V RMS) household-level voltage. The variation of a property with time is a waveform of the property.

At step 406, sampler 503 samples detected properties and records the sampled values in a memory. The variation of the values with time represents the waveform of the respective property. Sampler 503 samples at a rate sufficient to record variations of the properties within a respective period of the waveform of the property. In some embodiments, the detected properties are sampled at a rate to capture full waveforms of the electrical inputs. The term "full" refers to an amount sufficient to represent the shape and/or form of a complete waveform within a specified degree of tolerance from the actual waveform. For example, a characteristic of the electrical input may include a transient behavior with high frequency components (relative to the nominal/carrier electrical input frequency). The sampling rate to capture such a characteristic would be higher than (for example, at least twice) a frequency of the characteristic. As another example, impulsive and oscillatory transients can be fast, down to 5 nanosecond rise time and 50 nanoseconds in duration, but typically have a lifetime of around 50 microseconds (µs) (e.g. lightning strikes are often modeled as a decaying exponential with a 1.2 µs rise time and a 50 µs decay time). Certain embodiments with maximum 64 ksps sampling rates (sample period of $\delta t \cong 16$ µs) may be able to detect such events. Certain embodiments are able to detect impulsive low-frequency behaviors in which the rise time is 0.1 microsecond and the fall is 1 microsecond, with a frequency of up to 5 kilo Hertz (kHz). Certain embodiments are able to detect impulsive medium-frequency events, with durations ranging between about 50 nanoseconds and 1 microsecond, and frequencies of around 5 to 500 kHz. Certain embodiments are able to detect impulsive high-frequency events with durations of less than 50 nanosecond and frequencies of around 0.5 to 5 mega Hertz (MHz). A higher sampling rate results in a richer set of sampled and recorded data that captures a greater range of phenomenology. That is, more events are able to be captured in the sampled and recorded data.

At step 408, the sampled values are associated with one or more Global Positioning System (GPS) clock signals (or some other synchronized clock source) by the monitoring device 500. The GPS clock signals are received by receiver 501. In some embodiments, time stamps are associated with a portion of the sampled values at a predetermined frequency. In some embodiments, a microcontroller 502 or an application-specific integrated circuit (ASIC) associates the sampled values with the GPS clock signals. At step 410, the device stores the sampled values and associated time stamps in a memory. In some embodiments, microcontroller 502 or an ASIC stores the sampled values and associated time stamps in the memory.

At step 412, a monitoring task may be complete and the device can communicate the data to one or more central processing facilities. In some embodiments, the data is stored in a removable storage device, such as an SD card, a micro SD card, or a thumb drive. In some embodiments, the monitoring device transmits the data over a wired or wireless network to the central processing facilities. At step 414, the central processing facilities receive the sampled values and associated GPS clock signals and aggregates it with data transmitted from other monitoring devices. At step 416, the data from multiple monitoring devices is synchronized or compared using their associated clock signals as markers. In some embodiments, the aggregated data can be rendered into a model of the synchronized waveforms of multiple monitoring devices. In some embodiments, the model includes full waveforms reproduced from analog inputs within a designated error threshold.

At step 418, an operator may implement several data analysis techniques based on the aggregated data to detect differences between waveforms from the same or different monitoring devices, to detect features of the electrical grid such as transients, propagation errors, disturbances, or other indicia of system instability, and/or to determine the state of the electrical grid or a section of the electrical grid. The richness of the data received from the multiple monitoring devices may enable an operator to detect subtle events and better pinpoint the location of all events.

In some embodiments, one or more central processing facility records the physical location of a monitoring device. In some embodiments, the monitoring device determines its location using a GPS signal and communicates its location to the central processing facilities. In some embodiments, user input is needed to register the location of the monitoring device. In some embodiments, the monitoring device communicates with the central processing facilities over a network and settings or attributes of the network enable the central processing facilities to determine the location of the monitoring device. In some embodiments, the location information of the monitoring device is aggregated with the synchronized sampled values, which may enable an operator to pinpoint the locations causing or affected by a feature of the electrical grid, down to the level of the location where the monitoring device is coupled.

As described, the disclosed monitoring methods enable monitoring of an electrical grid by collecting information at multiple locations coupled to the electrical grid. The disclosed methods sample and record measurements of electrical properties of the electricity provided by the electrical grid. The methods capture, in real-time, full electrical property, e.g. voltage and current, information from low-voltage endpoints for versatile data analysis. The disclosed monitoring methods record full waveforms of voltage and/or current by sampling at higher rates relative to conventional PMUs and similar devices, enabling the capture of characteristics of the electricity provided by an electrical grid that are not captured by many currently used technologies. The disclosed monitoring methods enable collection of data of low-level voltage locations, such as household voltage, which can be used to determine the state of a grid at a particular location, whereas existing methods typically measure electrical properties at high voltage substations. The richness of the data collected and analyzed according to the disclosed methods according to the present invention, may enable an operator to identify an area affected by a detected feature and to pinpoint a location of a cause of the feature or the locations affected by the feature.

II. Monitoring Device

Described herein are monitoring devices according to the present invention that can be used to monitor an electrical grid by collecting information at multiple locations coupled to the electrical grid. Disclosed monitoring devices may be connected through a household wall socket to the grid to collect data about characteristics of electricity provided by the grid at the installed locations. Disclosed devices may transfer collected data to one or more central processing facilities that can then aggregate data received by multiple monitoring devices at respective locations on the grid. The aggregated data can then be analyzed to assess a region of the grid. In some embodiments, the monitoring device has a small form factor, is low-cost, is easy to install by plugging into a wall socket, and is easy to use by laypersons.

Monitoring devices according to the present invention described herein are capable of capturing, in real-time, full electrical property, e.g. voltage and current, information from low-voltage endpoints for versatile data analysis, in a low cost, easy-to-operate package with a small form factor. Unlike existing devices used for monitoring an electrical grid such as PMUs, the disclosed monitoring devices record full waveforms of voltage and/or current at high sampling rates, enabling the capture of characteristics of the electricity provided by an electrical grid that are not captured by PMUs and other similar devices and systems. Also unlike existing devices, the disclosed monitoring devices may collect data of low-level voltage locations, such as household voltage, which can be used to determine the state of a grid at a particular location, whereas existing devices and systems typically measure electrical properties at high voltage substations. Disclosed monitoring devices can transfer the collected data to one or more central processing facilities, which aggregate data from multiple monitoring devices enabling analysis not available with conventional systems.

The disclosed monitoring devices have many advantages. For example, in some embodiments, monitoring devices are inexpensive compared to conventional devices because monitoring devices use a combination of off-the-shelf and low cost components. Additionally, monitoring devices are easy to install because they are lightweight and have a small form factor design that easily plugs into a conventional wall socket. Furthermore, monitoring devices are easy to use because they can activate automatically and operate autonomously, without user intervention. Also, richer data sets, capturing full waveforms sampled at high rates, are obtained from monitoring devices disclosed herein. These data sets may capture more characteristics of electrical properties than data sets recorded and transmitted by conventional devices, such as PMUs, that filter the electrical properties prior to taking measurements, and report at low frequencies from few substations.

FIG. 5 illustrates one embodiment of the described monitoring devices. Monitoring device 500 is easy-to-install, easy-to-use, has a small form factor, and provides maximal information about the immediate, local and greater power grid by measuring and providing standard household-level voltage and current waveforms.

Various components included in monitoring device 500 may be customized or purchased off-the-shelf and assembled as a single unit structure. In some embodiments, using off-the-shelf components helps reduce the cost of monitoring device 500. Off-the-shelf components may include GPS receiver module 501, microcontroller 502, sampler 503, detector 512, Ethernet adapter 507, wireless adapter 508, and connector 511. Other components of monitoring device 500 may also be purchased off-the-shelf.

Connector 511 is used to install monitoring device 500 to a wall socket. Values of properties of electricity transmitted over an electrical grid to a household or business are detected through connector 511. In some embodiments, as shown for example in FIG. 6B, connector 511 is an AC power plug that is affixed to monitoring device 500. Connector 511 is made of a conductive material that allows monitoring device 500 to be connected to a primary alternating current (AC) power supply in a building. Connector 511 may differ in voltage and current rating, shape, size and type, depending on regional requirements. The AC electrical power carried over connector 511 is used by monitoring device 500 to monitor and record the state of the electrical grid. In some embodiments, the power carried over connector 511 may also be used to provide operational power to monitoring device 500 or to recharge a battery in monitoring device 500.

Detector 512 detects one or more properties of the electricity received through the connecter 511. For example, detector 512 may be configured to detect voltage and/or current. In some embodiments, detector 512 conditions the properties for use by other circuitry within monitoring device 500. For example, detector 512 may reduce the amplitude of a detected voltage to a range suitable for sampler 503. In some embodiments, detector 512 includes voltage downscaling circuit 504 and protection and isolation circuit 505. In some embodiments, voltage downscaling circuit 504 linearly reduces the AC input voltage signal (nominal (120/240 V RMS) to a level that lies between the safe input range of sampler 503. In some embodiments, a gain may be set to fully capture transients, which may have temporary amplitudes of over double the nominal (120/240V RMS) amplitude. The full waveform of the detected voltage can be later recovered by multiplying the data by a downscaling factor and the inverse of any applied gain. In some embodiments, detector 512 includes protection and isolation circuit 505 to protect sampler 503 and other internal circuitry from input signals that lay outside the safe input range. For example, transient over-voltages can occur on AC lines because of lightning, industrial applications, switching surges, electrostatic discharge, or other causes. In some embodiments, detector 512 includes filters for conditioning the incoming electricity. These filters may be adjustable through hardware settings or software settings. In some embodiments, detector 512 can detect other inputs to monitoring device 500 through optional auxiliary inputs (e.g., environmental data such as temperature, humidity, audio, and other conditions). Such auxiliary inputs may be captured, recorded, time-stamped, and reported along with electrical property waveform data enabling sophisticated correlation between auxiliary inputs (e.g., environmental conditions) and electrical grid performance. In some embodiments, protection and isolation circuit 505 is configured to provide a buffer between auxiliary inputs and other circuitry within monitoring device 500.

Certain embodiments are able to monitor environmental conditions, for example through auxiliary inputs. Monitored environmental conditions can reveal correlated trends that can be useful for removing systematic biases or explaining data trends in the monitored data. For example, according to certain embodiments, a temperature probe placed outside and connected to monitoring device 500 may enable correlation of grid performance with temperature. According to certain embodiments, a magnetic flux detector is connected to monitoring device 500 to record solar weather, which may geomagnetically induce currents in the electric grid, to enable correlation with grid performance. In certain embodiments, a humidity detector is connected to monitoring device 500 to enable correlation of humidity with grid performance. These are but a few examples of the environmental conditions that may be recorded through auxiliary inputs to monitoring device 500. In certain embodiments, data sampled and recorded from auxiliary inputs is associated with GPS clock signals. In some embodiments, including the sampling and recording functions with the auxiliary data capture capability of auxiliary input devices (e.g., those described above) reduces the cost and development barriers for information capture and analysis. In certain embodiments, any external measurement device that outputs a voltage proportional to a measurement may be connected to monitoring device 500 through auxiliary inputs.

In some embodiments, detector 512 can detect both voltage and current allowing monitoring device 500 to record representations of both voltage and current waveforms. Notably, monitoring device 500 can detect current waveforms even without a variable, terminating load. For example, monitoring device 500 may draw a small amount of current through a resistor and record the waveform of that current. Current waveform information recorded in this way may provide useful information on transients and harmonic contents of the electricity in the grid. Current waveforms may contain useful information including the detection of upstream transients and harmonic content of the electricity in the grid. In some embodiments, monitoring device 500 monitors current draw from an appliance connected to the monitoring device. In some embodiments, monitoring device 500 monitors the current draw of a connected appliance and the characteristics of the electricity in the character grid, by detecting and monitoring current.

In some embodiments, one or more detected properties are received by sampler 503. In some embodiments, sampler 503 includes a precision analog-to-digital (ADC) converter for sampling the detected inputs. For example, sampler 503 may sample downscaled voltage, current, and/or other inputs received from detector 512. In some embodiments, sampler 503 is an application specific integrated circuit (ASIC).

Unlike conventional PMUs that only record phasor information (i.e., amplitude and phase) or only record event snippets of voltage waveforms, sampler 503 samples at a rate sufficient to capture disturbances in properties of the electricity provided by the electrical grid. In some embodiments, the rate is sufficient to capture disturbances that are undetectable by a PMU or indiscernible in the phasor data communicated by a PMU. The data generated by sampler 503 represents full waveforms of the electrical properties, e.g., voltage and/or current, that facilitates analysis of the electrical grid not available with information gathered by conventional devices, which improves the ability to identify disturbances, events, and patterns of disturbances, events, or both. Identification of such characteristics of the electrical grid may offer grid operators the ability to predict malfunctions, identify inefficiencies, or otherwise improve grid operation and power delivery.

In some embodiments, a high sampling rate may be used (e.g., high relative to conventional devices and systems, such as PMUs). In some embodiments, an increased sampling rate improves detection of transients, short duration disturbances, and/or high frequency harmonic distortions, which imply possible failures or system instabilities. That is, events of shorter durations such as transients are more readily detected by using higher sampling rates, as well as capturing greater incoming bandwidth (i.e., larger frequency range). In contrast, transients of shorter duration or disturbances of higher frequency are undetected by conventional PMUs because they sample at much lower frequencies, and because they filter electricity prior to recording phasor information, which precludes full waveform data capture that may useful for identifying transients. Thus, the higher sampling rate, in comparison to traditional PMUs or similar products, allows for capturing fleeting transients, analyzing other short, time-domain events, and capturing wider bandwidth (i.e., greater frequency range).

A full waveform refers to measurements of amplitude over time of an analog signal that can be used to discern the actual shape and form of a wave as opposed to an ideal shape and form or an approximate shape and form. Full waveform data is not discernable from phasors reported by conventional devices, which irreducibly remove information about the electrical grid. That is, through the process of converting a waveform to a phasor in the manner employed by conventional devices such as PMUs, information is irreducibly lost. For example, certain time-domain or full-frequency domain analyses are not possible with phasors, yet these types of analyses may reveal valuable information about power grid dynamics which are not detected by conventional PMUs. Accordingly, monitoring device 500 permits a full spectrum of analysis techniques.

Thus, monitoring device 500 can monitor full waveforms of voltage and/or current of a low-voltage source (e.g. household-level voltages of 115-240 V RMS) at a higher sampling rate (e.g. greater than 500 samples-per-second (sps), greater than 5 kilo-samples-per-second (ksps), or greater than 50 ksps) and then may record all or part of that waveform data locally and/or transmit all or part of the waveform data for storage at one or more central processing facilities. In some embodiments, the sampling rate is 5 ksps, and in certain embodiments, the sampling rate is 64 ksps. In some embodiments, the sampling rate is 128 ksps or 256 ksps. In some embodiments, the sampling rate is adjustable.

A reliable synchronized clock may be used as a common time source for sampling across multiple monitoring devices. In some embodiments, synchronicity is maintained by using a GPS clock signal as a common time source to sample analog inputs. Thus, synchronization sampling errors across multiple measuring points can be virtually eliminated by using the synchronized time source (e.g., a clock derived from GPS signals or disciplined by GPS signals). In some embodiments, a clock generator may be included in monitoring device 500 and used as a reference to sample characteristics of electricity. A GPS clock signal may then be used to synchronize the sampled data across multiple monitoring devices.

In some embodiments, sampler 503 receives time information from GPS receiver module 501 for marking the sampled values with global timing information to enable later synchronization with data from other monitoring devices. In some embodiments, GPS receiver module 501 may provide one pulse-per-second (pps) and two MHz digital clock locked to GPS and National Electrical Manufacturer Association (NEMA) GPS sentence information. These signals can drive the waveform sampler 503 and provide microcontroller 502 with the information necessary to tag the sampled data with time and date information (1 pps block pulse and GPS NEMA message). In some embodiments, the GPS receiver module 501 is configured to generate position information which may be used by monitoring device 500 to tag the monitored and recorded electrical characteristics with the location where monitoring device 500 is installed. In some embodiments, GPS receiver module 501 generates location information only when monitoring device 500 is installed at a certain location and then ceases to generate location information to conserve power. The GPS receiver module 501 may be specifically chosen to be low power.

Figure 6A:
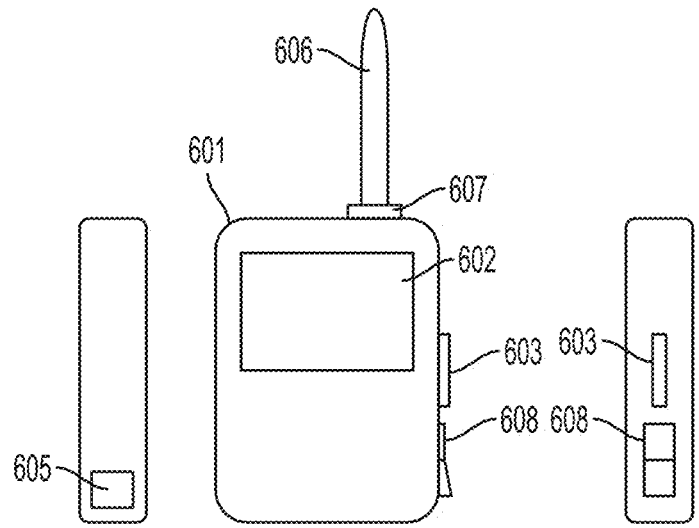
FIG. 6A depicts front and side views of external features of the disclosed monitoring device according to some embodiments.
Figure 6B:
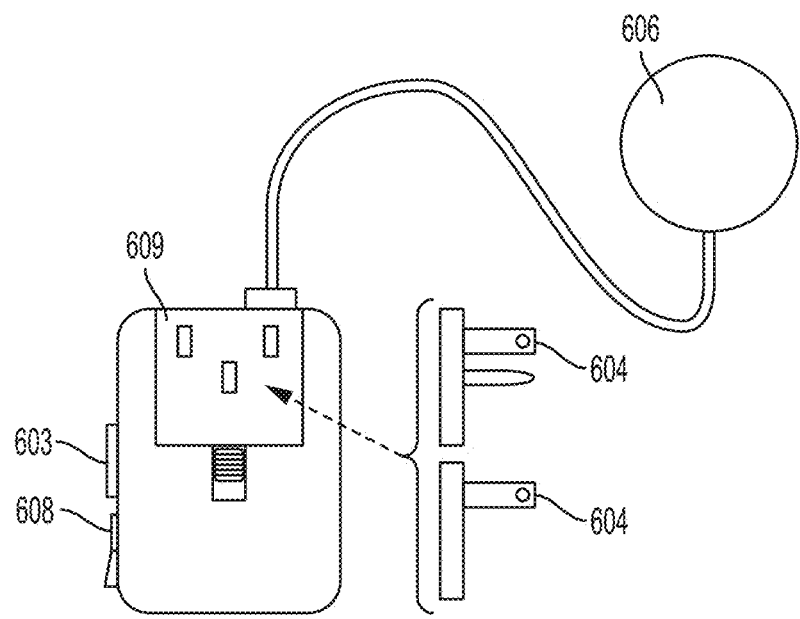
FIG. 6B depicts a back view of external features of the disclosed monitoring device according to some embodiments.

In some embodiments, receiver 501 is connected to a GPS antenna that is embedded in monitoring device 500. In some embodiments, as depicted in FIG. 6A, receiver 501 is connected to a GPS antenna that is external to monitoring device 500. In some embodiments, GPS antenna 606 is a quadrifilar helix style antenna. As depicted in FIG. 6B, in some embodiments, GPS antenna 606 is a patch style antenna with various possible cord lengths. In some embodiments, GPS antenna 506 is interchangeable with other styles of GPS antennae.

In some embodiments, monitoring device 500 can include a microprocessor, microcontroller, ASIC or a combination thereof that is capable of performing data collection, data processing, and data analysis. This combination of processing components is referred to herein, individually and collectively, as microcontroller 502. Microcontroller 502 may itself include an analog to digital convertor, GPS receiver, a microprocessor, and a memory. Each component may include computer software, hardware, combinations thereof, or a component of a computer program capable of performing a particular function that may be stored on one or more non-transitory computer readable mediums. Thus, while several different components are mentioned for the sake of clarity, it is to be understood that the functions of any combinations of the various components, which may include filters, A/D converters, GPS receiver, microprocessors, memory, and microcontrollers, may be performed by a single hardware component, for example a microprocessor.

In some embodiments, microcontroller 502 runs device operation and coordinates the separate components. For example, in some embodiments, microcontroller 502 receives sampled data from sampler 503, associates or tags the data with GPS information received from GPS receiver 501 and stores the combined information in a memory. In some embodiments, microcontroller 502 stores the information in a removable solid state storage or transfers the information to one or more central processing facilities through an Ethernet adapter or a wireless adapter. In some embodiments, microcontroller 502 runs custom embedded code.

In some embodiments, a programmable clock provided by an ASIC that operates software for monitoring device 500 can be set to drive sampler 503. For example, the ASIC clock can be programmed to 2 MHz, to drive sampler 503. Thus, a controlled oscillator (i.e., disciplined oscillator) does not need to be used when a clock is digitally derived from an ASIC. Using a digitally-derived clock from the GPS module of an ASIC reduces power consumption, contributing to the low power consumption of certain monitoring devices 500. In contrast, other types of GPS-disciplined oscillators, like crystal ovens (OCXO or oven-controlled crystal oscillator), are very power hungry. Notably, using an ASIC rather than microcontroller 502, or any other standard processor, will help reduce power consumption by monitoring device 500.

In some embodiments, microcontroller 502 communicates with a memory that has stored therein one or more software programs, which commands the monitoring device 500 to execute the required steps of the disclosed monitoring process. The software programs for executing the disclosed monitoring process may be available for download by the device through a network interface in communication with a smartphone or any other computing device. In some embodiments, the software program for executing the disclosed monitoring process may be available for installation via a removable data storage device, such as a Universal Serial Bus (USB) flash drive, or other portable storage devices. In some embodiments, the software program for executing the disclosed monitoring process may be pre-installed in one or more memories of monitoring device 500 to function solely as the disclosed processing component.

The recorded values representing the waveforms of detected properties associated with GPS information is transferred to one or more central processing facilities for further processing and analysis. Monitoring device 500 may be configured to transfer the information in a number of ways. For example, in some embodiments, monitoring device 500 includes a solid state storage 510, an Ethernet adapter 507, and/or a wireless adapter 508. In some embodiments, monitoring device 500 may include multiple storage or transmission components to facilitate transmission of monitoring data.

In some embodiments, monitoring device 500 records and/or transfers additional data to one or more central processing facilities, such as GPS location information. In some embodiments, monitoring device 500 records and/or transfers data about the status and settings of the monitoring device such as sampling rate, monitoring mode, and/or model number. In some embodiments, monitoring device 500 performs analysis on sampled values and records and/or transfers the results of the analysis. In some embodiments, monitoring device 500 monitors auxiliary inputs from auxiliary sensors detecting environmental conditions, such as humidity and temperature, and records/transfers the data.

In some embodiments, monitoring device 500 transfers data via solid state storage 510. In some embodiments, solid state storage 510 is removable by a user. For example, solid state storage 510 may be an SD card, a micro SD card, or a USB thumb drive. Monitoring device 500 stores sampled values with associated time information on solid state storage 510. A user may periodically remove solid state storage 510 and send its contained data to one or more central processing facilities. For example, a user could ship solid state storage 510 to the central processing facilities and/or a user could install solid state storage 510 in a computer and upload the data to the central processing facilities. Central processing facility in this context includes a program on a computer for analyzing the sampled data. In some embodiments, the data may be transmitted by a computer to one or more central processing facilities through a direct connection or via the internet. In some embodiments, solid state storage device 510 is configured to store sampled data over a period of at least an hour. In some embodiment solid state storage device 510 stores sampled data over a period of hours, half a day, a whole day, multiple days, a week multiple weeks, a month, multiple months, a year, or multiple years.

In some embodiments, sampled values, and/or other data, may be transmitted from monitoring device 500 to one or more central processing facilities through transmitter 514 via a cable, including but not limited to any combination of a Universal Serial Bus (USB) connection, wired Internet, for example a wired local area network (LAN), and/or wireless communication, for example, wireless local area network (WLAN), Global System for Mobile Communications (GSM), Enhanced Data GSM Environment (EDGE), Bluetooth, and Wireless Fidelity (Wi-Fi). In some embodiments, Ethernet adapter 507 is used by monitoring device 500 for connecting to a wired network. The recorded data may be transferred over the wired network to a local storage or processing system or may be transferred via the wired local area network to a remote central processing facility via the internet.

In some embodiments, monitoring device 500 may include wireless adapter 508 for connecting to a wireless network. The recorded data may be transferred over the wireless network to a local storage or processing system or may be transferred via the wireless network to a remote central processing facility via the internet.

In some embodiments, monitoring device 500 is able to push data to one or more central processing facilities in up to real-time over a wired or wireless network. Up to real-time includes transmitting continuously and transmitting in bursts. Up to real-time also includes delays required for a microcontroller or other processing component(s) to receive the sampled data, associate it with GPS information, and coordinate transmission of the information. Up to real-time speed may include delays on the order of up to seconds, up to a minute, up to five minutes, up to 10 minutes, up to 30 minutes, and up to an hour.

In some embodiments, the sampled values are stored locally in a memory and collected by one or more central processing facilities at a later time. In some embodiments, monitoring device 500 stores at least a portion of sampled values in a memory in the event of network outages or where there is no network connection. In some embodiments, the waveform data may be transmitted directly from monitoring device 500 to the central processing facilities without storing any waveform data in a memory.

In some embodiments, the waveform data transmitted from monitoring device 500 to one or more central processing facilities may be raw unprocessed data samples of electrical waveforms. In some embodiments, the data transmitted from monitoring device 500 may be preprocessed data generated by software code stored in a memory on monitoring device 500. In some embodiments, the computer software for monitoring device 500 may be representative of an algorithm. The algorithm may generate an output such as information about measured waveforms, as a function of time. In some embodiments, monitoring device 500 includes multi-function metering integrated circuit 509, which may be configured to provide real-time supplemental power metrics. For example, it may provide RMS voltage, reactive and apparent power, frequency, voltage sag, and other electrical characteristics. In some embodiments, data generated by multi-function metering integrated circuit 509 is tagged with GPS data and stored or transmitted by monitoring device 500 along with or separately from sampled values. In some embodiments, multi-function metering integrated circuit 509 is an ASIC.

In some embodiments, monitoring device 500 may be programmed with a plurality of different target modes, each target mode capturing different characteristics for different periods of time. For example, monitoring device 500 can be programmed to sample voltage waveforms and current waveforms at different times, and enter a reduced power consumption mode at other times to complete any maintenance operations. In some embodiments, each target mode or a particular target mode may be tailored to a particular geographical region or portion of an electrical grid. In some embodiments, monitoring device 500 includes a communication receiver for receiving instructions to program a target mode of the monitoring device.

In some embodiments, monitoring device 500 includes a power management system 506. The power management system 506 may include a low noise AC to DC transformer for powering the device and charging a battery, a power management integrated circuit (PMIC), a charger, a battery, and power conditioning circuitry. In some embodiments, monitoring device sips power from the AC line during regular usage. In some embodiments, a battery (e.g., 1500 mAh capacity) provides backup power in cases of power loss or brownouts. This enables monitoring device 500 to continue recording despite short or long term power outages.

FIGS. 6A and 6B depict external features and dimensions of the disclosed monitoring device according to some embodiments. FIG. 6A is a front, left, and right side view of one embodiment of monitoring device 500. As shown, the monitoring device may be designed to be compact. For example, the external casing 601 may be 2.75 inches by 4.5 inches by 1.25 inches. Preferably, external casing 601 is 2.5 inches by 3.5 inches by 0.75 inches. In some embodiments, external casing 601 is approximately the width and height of a standard switch or outlet cover plate. Preferably, the width and height of casing 601 are smaller than a standard witch or outlet cover plate. In some embodiments, external casing 601 is designed to be rugged to safely enclose the internal components. In some embodiments, monitoring device 500 is supported entirely by the socket into which it is installed. In other words, monitoring device 500 does not touch the ground, a table, a shelf, or any other support. In some embodiments, monitoring device 500 includes a hole through which a screw may be passed to fasten the monitoring device to a threaded hole in the socket. In some embodiments, monitoring device 500 incorporates a standard outlet cover for covering the wall socket to which monitoring device 500 is connected.

The front of the monitoring device 500 in FIG. 6A includes a status screen 602 containing information that may be relevant to a user. The information provided may include configurable settings of the device such as sampling frequency and data collection/transmission mode specifying whether monitored data is stored locally or transmitted over a network. The information may also include an internet protocol (IP) address if the device is connected to a wired or wireless network. Furthermore, the screen may include information such as software version number, and the voltage and frequency of the electricity at the location. GPS information such as signal strength may also be presented. In some embodiments, status screen 602 is designed to display useful information about the state of the device without compromising energy consumption. In some embodiments, status screen 602 is a liquid crystal display (LCD) or an organic light emitting diode (OLED) display.

In some embodiments, monitoring device 500 may have an external GPS antenna 606. The GPS antenna may be a quadrifilar helix style as depicted in FIG. 6A or it may be a patch style with various cord lengths as shown in 6B. Other types of antennae are contemplated, such as Spiral helices, microstrips, planar rings ("choke ring"), and other multi-path-resistant designs. In some embodiments, monitoring device 500 is configured with removable GPS antennae that can be swapped out depending on the local GPS reception conditions.

The left view of FIG. 6A depicts a modular connector 605 for connecting an Ethernet cable to enable the monitoring device 500 to connect to the local network. In some embodiments, modular connector 605 is an 8 pin, 8 conductor RJ45 style Ethernet connector. In some embodiments, monitoring device 500 includes a female SMA connector for attaching interchangeable GPS antennae.

The right view of FIG. 6A depicts a power switch 608 used to power the device on and off. In some embodiments, the monitoring device automatically turns on when plugged into a wall outlet. Also shown is a storage card 603 for storing monitored data. Storage card 603 is removable allowing an alternative way to send data to one or more central processing facilities. For example, storage card 603 may be an SD card, a micro SD card, or a thumb drive.

FIG. 6B depicts a rear view of an embodiment of monitoring device 500. Locking power plug receptacle 609 is configured to receive an exchangeable power plug 604 and lock the plug into place. A release may be built into power plug receptacle 609 to enable removal of an inserted power plug 604. Several styles of exchangeable power plug 604 may be inserted into power plug receptacle 609. In this way, monitoring device 500 may be installed in locations with varying types of wall sockets. For example, FIG. 6B shows two styles of power plug 604, a two-prong type for plugging into a standard 110 volt, 15 amp wall socket without a ground (e.g., NEMA 1-15) and a three-prong type for plugging into a standard 110 volt, 15 amp grounded outlet (e.g., NEMA 5-15). Power plug 604 may be designed to plug into other wall outlet configurations, such as 220 volt North American outlets. Other configurations include those used in foreign countries such as British 6-15, BS 546, and 1363, and Europlug CEE7/4, 7/5, and C/16.

In some embodiments, monitoring device 500 is designed for input voltage of up to 300 V RMS with −425 V to +425 V peak to peak voltage. Monitoring device 500 may be designed to handle standard 120 V RMS and 220 V RMS household voltages. Monitoring device 500 may be configured to sample from 1 kHz to above 64 kHz. In some embodiments, the sampling rate is configurable and may be set by one or more central processing facilities through control instructions sent over a wired or wireless network to a communication receiver in monitoring device 500. In some embodiments, the sampling rate may be set by a smartphone connected to monitoring device 500 through Bluetooth or other wireless or wired connection. In some embodiments, monitoring device 500 has a resolution of 16 bits or 24 bits and a gain of 1 times to 12 times. In some embodiments, the resolution and gain are configurable by one or more central processing facilities. In some embodiments, the expected battery life without charging is over thirty days. In some embodiments, the monitoring device 500 may continue to monitor during an input power loss by using the battery. In some embodiments, the battery life for powering the monitoring device 500 during continuous monitoring is up to 12 hours.

Figure 8A:
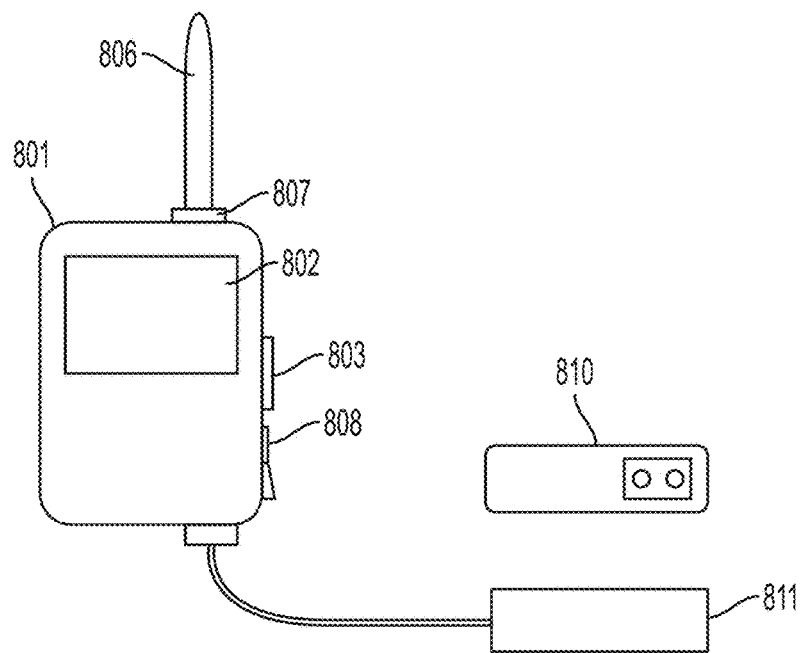
FIG. 8A depicts external features of the disclosed monitoring device with an external sensor according to some embodiments.
Figure 8B:
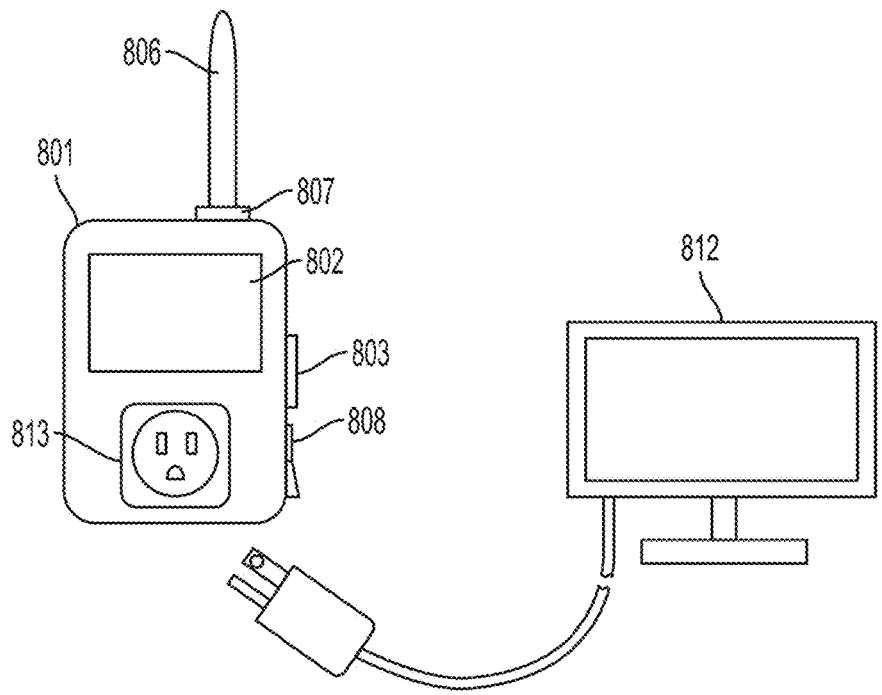
FIG. 8B depicts external features of the disclosed monitoring device with a female output plug according to some embodiments.

In some embodiments, monitoring device 500 is configured to sample inputs other than the electricity received through electrical connector 511 (FIG. 5). Monitoring device 500 may include an auxiliary port 810 as shown in FIG. 8A for connecting an auxiliary input. For example, an external sensor 811 may be connected to monitoring device 500 through auxiliary port 810 to provide environmental data such as temperature, humidity, audio, and other conditions. In some embodiments, auxiliary port 810 is a banana plug style female receptacle.

In some embodiments, auxiliary inputs transmitted through auxiliary port 810 may be received by detector 512. Detector 512 may condition the auxiliary signals and transmit the conditioned signals to waveform sampler 503 for sampling along with the electrical characteristics. In some embodiments, the auxiliary inputs may be routed to a multi-function metering integrated circuit 509 for further processing and/or analysis. The data produced may be associated with GPS clock signals from GPS receiver 501 and stored or transmitted by microcontroller 502 or combined with sampled values and associated GPS clock signals and stored or transmitted by microcontroller 502. In some embodiments, auxiliary input is time tagged, along with electrical property waveforms enabling correlation of auxiliary input with waveform data.

In some embodiments, monitoring device 500 is configured to monitor the electricity passing through female output plug 813. Monitoring devices configured in this way may serve as appliance monitors to monitor the power draw of the appliance over time. Instead of monitoring wall voltage, or in addition to monitoring wall voltage, the device would monitor the appliance plugged into the grid monitor. Other features may remain constant (e.g., GPS common-clock, networked operation, etc.). This configuration is inward looking and may be used by a consumer to provide real-time information about the behavior of a multitude of equipment scattered over an arbitrary grid. In some embodiments, the same internal electronics may be used to measure and monitor the electrical performance of an external appliance 812 plugged into female outlet plug 813. A monitoring device 500 configured in this way improves on existing device electrical performance monitors by providing a permanent record of device electrical behavior, pushing device information to a central location for broad aggregation, overview, and analytics, operating in synchrony (with respect to the common GPS clock signals) and coordination with other power monitoring devices, and monitoring at a high sampling rate and with high fidelity.

In certain embodiments, monitoring device is configured to monitor the electricity passing through female output plug 813 and to monitor environmental conditions, for example, through auxiliary inputs connected to auxiliary port 810. Monitored environmental conditions can reveal correlated trends that can be useful for removing systematic biases or explaining data trends in the monitored data. For example, according to certain embodiments, a temperature probe connected to monitoring device 500 may enable correlation of appliance performance with temperature. According to certain embodiments, a magnetic flux detector is connected to monitoring device 500 to record solar weather, which may geomagnetically induce currents in the electric grid, to enable correlation with appliance performance. In certain embodiments, a humidity detector is connected to monitoring device 500 to enable correlation of humidity with appliance performance. These are but a few examples of the environmental conditions that may be recorded through auxiliary inputs to monitoring device 500. In certain embodiments, data sampled and recorded from auxiliary inputs is associated with GPS clock signals. In some embodiments, including the sampling and recording functions with the auxiliary data capture capability of auxiliary input devices (e.g., those described above) reduces the cost and development barriers for information capture and analysis. In certain embodiments, any external measurement device that outputs a voltage proportional to a measurement may be connected to monitoring device 500 through auxiliary inputs.

Monitoring device 500 is a consumer-grade hardware product for capturing the full-dynamics of electricity propagated over the grid to households or businesses. Further, the monitoring device 500 is easy to install, easy to use, and in single-unit package.

In some embodiments, monitoring device 500 has a single-unit construction that includes a network interface for communicating with other computing devices or a remote device at the central processing location. For example, the device can communicate with a smartphone that runs an application that can be used to program the device or receive monitoring information therefrom. The disclosed device provides easy installation to democratize information collection and makes it possible for any interested party to collect wide-area, real-time information on the dynamic state of the power grid.

Monitoring device 500 includes several other attributes that distinguish it from PMUs or similar devices. For example, monitoring device 500 has a compact form factor that includes all measurement components in a single, small, easy-to-use structure.

Monitoring device 500 can be inexpensive. Unlike PMUs, monitoring device 500 could be made less expensive (e.g., less than $500) because it uses off-the-shelf components. The inexpensive attribute of monitoring device 500 can drive widespread adoption that improves monitoring. For example, distributing a greater number of monitoring devices 500 across an electrical grid at locations that are not predetermined improves the quantity (more monitoring points recording more data per unit time) and quality (full waveform capture) of electrical property data used to monitor an electrical grid. Also, the amount of data not only exceeds that of conventional PMUs but also reveals information about electrical property waveforms at household-by-household resolution. These attributes permit the installation of an array of monitoring devices 500 for use by any entity (e.g., private, government, academic) across any geography of choice, democratizing the availability of power grid data.

In addition, monitoring device 500 accesses household or business level voltage instead of the medium and high voltage points of substations. This enables the disclosed device to be placed anywhere without professional installation. The device is also easily deployable because it has a plug-and-record capability. Thus, network setup is equally simple. Accordingly, limited to no user intervention is required. In addition, monitoring device 500 also has low power consumption (e.g., less than 1 W) and may include a battery backup to maintain operation during power outages. Accordingly, the disclosed device is easy to install, easy to use, and provides access to a richer data set, which is important for scientific study and opens up possibilities for commercialization efforts that capitalize upon these features.

As described, the disclosed monitoring devices can be used to monitor an electrical grid by collecting information at multiple locations coupled to the electrical grid. Described monitoring devices may be connected through a household wall socket to the grid to collect data about characteristics of electricity provided by the grid at the installed locations. The devices may transfer collected data to one or more central processing facilities that can then aggregate data received by multiple monitoring devices at respective locations on the grid. The aggregated data can then be analyzed to assess a region of the grid. In some embodiments, described monitoring devices have a small form factor, are low-cost, are easy to install by plugging into a wall socket, and are easy to use by laypersons.

Monitoring devices described herein are capable of capturing, in real-time, full electrical property, e.g. voltage and current, information from low-voltage endpoints for versatile data analysis, in a low cost, easy-to-operate package with a small form factor. Unlike existing devices used for monitoring an electrical grid such as PMUs, the disclosed monitoring devices record full waveforms of voltage and/or current by sampling at high rates, enabling the capture of characteristics of the electricity provided by an electrical grid that are not captured by PMUs and other similar devices and systems. Also unlike existing devices, the disclosed monitoring devices may collect data of low-level voltage locations, such as household voltage, which can be used to determine the state of a grid at a particular location, whereas existing devices and systems typically measure electrical properties at high voltage substations. Disclosed monitoring devices can transfer the collected data to one or more central processing facilities, which aggregate data from multiple monitoring devices enabling analysis not available with conventional systems.

III. Monitoring System

Described herein are monitoring systems for monitoring an electrical grid by collecting information at multiple locations coupled to the electrical grid, transferring the collected information to one or more central processing facilities, and aggregate the information allowing analysis of the states of the electrical grid. The described monitoring systems sample and record measurements of electrical properties of the electricity provided by the electrical grid to locations being monitored. The systems capture, in real-time, full electrical property information, e.g. voltage and current, from low-voltage endpoints for versatile data analysis. Unlike existing systems used for monitoring an electrical grid, such as those based on frequency and phasor measurements, the disclosed monitoring systems record full waveforms of voltage and/or current by sampling at high rates, enabling the capture of characteristics of the electricity provided by an electrical grid that are not captured by many conventional methods. Also, the disclosed monitoring systems enable collection of data of low-level voltage locations, such as household voltage, which can be used to determine the state of a grid at a particular location, whereas many existing systems typically measure electrical properties at high voltage substations.

Disclosed monitoring systems associate collected data with GPS clock signals and transfer the data to one or more central processing facilities, which aggregate data from multiple monitoring devices enabling analysis not available with conventional systems. Consequently, the analyzed data can be used to determine characteristics of electricity at dispersed locations on the electrical grid, including the presence of disturbances, as well as to make predictive calculations about instabilities with a higher degree of granularity. The richness of the data collected and analyzed according to the disclosed systems according to the present invention, may enable an operator to identify an area affected by a detected feature and to pinpoint a location of a cause of the feature or the locations affected by the feature.

Disclosed monitoring systems include a plurality of monitoring devices for connecting to a plurality of electrical wall sockets connected to an electrical grid. Monitoring devices, such as those described above, are capable of capturing, in real-time, full electrical property, e.g. voltage and/or current, information from low-voltage endpoints for versatile data analysis, in a low cost, easy-to-operate package with a small form factor. Properties of the electricity are detected. The sampling rates of the plurality of monitoring devices are sufficient to record full waveforms of respective properties. In some embodiments, GPS clock signals are received and associated with the sampled and recorded values to enable synchronization of the values with other recorded values. The plurality of monitoring devices can transfer the collected data to one or more central processing facilities.

One or more central processing facilities may aggregate the data, which includes sampled values and associated GPS clock signals, using the GPS clock signals as markers to synchronize or compare received data. According to certain embodiments, the aggregated data is analyzed to detect features of the electrical grid and to determine locations affected by detected features. In some embodiments, an affected location can be a single household or business. In some embodiments, the location is a low-voltage sub-region of an electrical grid that is supplied by a low voltage transformer. In some embodiments, the sub-region is a region supplied by one or more substations.

In some embodiments of the disclosed monitoring systems, the central processing facilities are able to pinpoint multiple sub-regions that were affected by a detected feature at the same time. In some embodiments, the central processing facilities are able to determine the time that a detected feature occurred. In some embodiments, the central processing facilities are able to predict the occurrence of a feature by analyzing received data.

Figure 7:
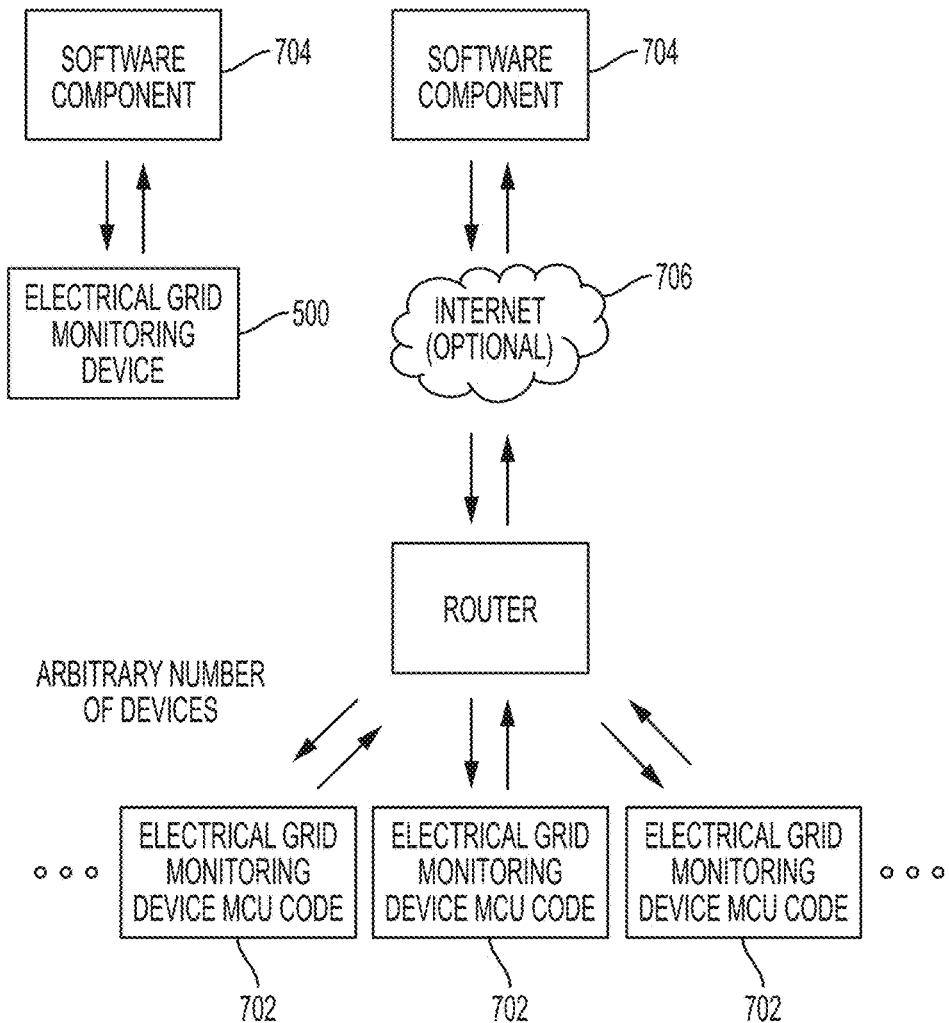
FIG. 7 depicts a system of multiple monitoring devices at different locations on an electrical grid that can communicate over a network with a central processing facility according to some embodiments.

FIG. 7 depicts two configurations of monitoring system 700. A networked configuration that may include multiple monitoring devices 702 that communicate with central processing facility 704 over network 706. In some embodiments, monitoring devices 702 are installed at different households or businesses to acquire characteristics of electricity at different points on a grid. In some embodiments, each of the monitoring devices 702 may receive control signals from central processing facility 704 and transmit data to central processing facility 704. Network 706 may include one or more cables, wired, and/or wireless communication, for example, Global System for Mobile Communications (GSM), Enhanced Data GSM Environment (EDGE), Bluetooth, Wireless Fidelity (Wi-Fi), or combinations thereof.

In some embodiments, monitoring system 700 is configured for direct communication between central processing facility 704 and monitoring device 500. The direct connection may include one or more cables, wired local area network (LAN), and/or wireless communication, for example, Global System for Mobile Communications (GSM), Enhanced Data GSM Environment (EDGE), Bluetooth, Wireless Fidelity (Wi-Fi), or combinations thereof.

In some embodiments, central processing facility 704 communicates with one or more monitoring devices 702 to get and set device parameters including sampling rate, number of active channels, gain, and fidelity. Central processing facility 704 may also direct monitoring devices 702 to start and stop data acquisition runs. In some embodiments, central processing facility 704 pushes software updates onto monitoring devices 702.

Central processing facility 704 may be or include one or more of the following: a server, desktop computer, laptop computer, tablet computer, smartphone and/or any other electronic device or a combination thereof capable of performing data collection, data processing, and data analysis. In some embodiments, central processing facility 704 may include a waveform data acquisition unit, a waveform analysis unit, a state, status and event generating unit, a comparison unit, and a memory. Each "unit" may include computer software, hardware, combinations thereof, or a component of a computer program capable of performing a particular function that may be stored on one or more non-transitory computer readable mediums. Although several different "units" are mentioned for the sake of clarity, the functions of any combinations of the various units may be performed by a single hardware component, such as a server.

In some embodiments, one or more memories of the one or more servers of central processing facility 704 include a database for storing waveform data. For example, the database may be stored in one or more non-volatile memories contained within or connected to central processing facility 704. In some embodiments, each of monitoring devices 702 may include one or more memories to store respective databases of waveform data. Each memory may include but is not limited to a hard disk drive (HDD), a solid-state drive (SSD), a Universal Serial Bus (USB) flash drive, and/or a Secure Digital (SD) memory card.

In some embodiments, a utility company may use system 700 to collect and store waveform data from various consumers that have respective monitoring devices 702 installed in their homes. System 700 may include one or more servers that are dispersed across multiple geographic locations and accessible by multiple control stations operated by the utility company. For example, the utility company may access waveform data stored in cloud storage that was received from multiple monitoring devices at respective households.

In some embodiments, central processing facility 704 may simply record waveform data acquired from monitoring devices 702. The recorded waveform data can be used to prepare baseline waveform data, which may be incorporated into a classification process as part of a learning algorithm for use later when determining the existence of an anomaly in electrical characteristics of a power grid, or subsection of a power grid. Subsequent analyzed waveform data that is classified by central processing facility 704 may be used to regularly update baseline waveform data in order to incorporate newly collected measurements into an analysis.

In some embodiments, waveform data is transmitted in real-time from monitoring devices 702 to central processing facility 704 over network 706. However, as the amount of waveform data increases, it may be impractical to constantly update central processing facility 702 with the new waveform data and/or store the increasing amount of data. Accordingly, in some embodiments, some waveform data may be stored temporarily in a local memory of monitoring device 500 and transmitted or transferred periodically or accessed on demand by the central processing facility 702. Thus, monitoring devices 702 can easily provide the most up-to-date waveform data to central processing facility 702 by using a variety of memory management schemes to balance storage between local and remote memories, at different times.

In some embodiments, households that install monitoring devices 704 can be randomly selected by power companies and/or self-selected by individual consumers. Unlike PMUs, waveform data output by monitoring devices 702 is not biased by relying exclusively on preselected locations that are assumed to be critical junctions of a grid. Moreover, using a greater quantity of monitoring devices, each of which samples characteristics of electricity at a higher rate, improves the ability to pinpoint subtle indications of stress on an electrical grid.

As detailed above, the acquired waveform data in the form of sampled values generated at high sampling rates (higher than conventional devices such as PMUs) has several attributes that help reveal valuable information about electrical grids, and drive the likelihood of widespread adoption by consumers and suppliers. These attributes include, but are not limited to, wide-area monitoring, higher sampling rate for improved transient detection, full waveform capture for improved feature detection, capture of either or both voltage and current waveforms, small form factor, ease-of-use, low voltage measurement, low power consumption, low cost and the like.

Thus, monitoring devices 702 improve monitoring of the immediate, local, regional, and national power grid network because each monitoring device 500 is easy-to-install, easy-to-use, and is relatively inexpensive to drive mass adoption by consumers or distribution by suppliers. Monitoring device 500 provides new capabilities because conventional technologies do not offer a dedicated, grid-monitoring device that captures and provides full waveforms of voltage and/or current from a standard, household outlet in real-time for all time as disclosed herein. This combination of attributes gives researchers, private industry, and government new capabilities including, for example, measurement of network topography, disaster management, event localization, real-time prediction, and localized power-quality monitoring including disturbance detection and analysis.

The monitoring methods, systems, and devices described herein can be used to monitor an electrical grid by collecting information at multiple locations coupled to the electrical grid. Disclosed monitoring devices may be connected through a household wall socket to the grid to collect data about characteristics of electricity provided by the grid at the installed locations. A central facility can then aggregate data collected by the multiple monitoring devices at respective locations on the grid. The aggregated data can then be analyzed to assess a region of the grid. In some embodiments, the monitoring device has a small form factor, is low-cost, is easy to install by plugging into a wall socket, and is easy to use by laypersons.

Monitoring methods, systems, and devices described herein are capable of capturing, in real-time, full electrical property, e.g. voltage and current, information from low-voltage endpoints for versatile data analysis. The disclosed monitoring methods, systems, and devices may record full waveforms of voltage and/or current by sampling at higher rates, enabling the capture of characteristics of the electricity provided by an electrical grid that are not captured by PMUs and other similar devices and systems. The disclosed monitoring methods, systems, and devices may collect data of low-level voltage locations, such as household voltage, which can be used to determine the state of a grid at a particular location. The sampled data may be associated with a time stamp to facilitate aggregation of data from multiple monitoring devices distributed on an electrical grid. Disclosed monitoring methods, systems, and devices can transfer the collected data to one or more central processing facilities, which aggregate data from multiple monitoring devices enabling analysis not available with conventional systems.

By providing full waveforms of voltage and/or current in real-time from a standard outlet, the disclosed monitoring methods, systems, and devices provide the ability to monitor the characteristics of an electrical grid based on more data points to reveal grid performance, detect events, anomalies, and disturbances, and determine stability at various levels of granularity that are not possible with existing devices.

The invention claimed is:

1. A device for monitoring the properties of an electrical grid comprising:
an electrical connector for coupling to the electrical grid through a wall socket;
a detector for detecting at least one property of electricity provided by the electrical grid through the wall socket;
a receiver for receiving clock signals from a remote clock synchronization source through an antenna of the device; and
a sampler for sampling a respective detected property and recording sampled values in a memory, wherein the variation of the values with time represents a waveform of the respective property and the sampler samples at a rate of at least 50 kilo-samples-per-second to record variations of the property within a period of the waveform,
wherein the device associates at least a portion of the sampled values with at least one clock signal.

2. The device of claim 1, wherein the electrical connector is a wall socket plug.

3. The device of claim 1, wherein the detector detects voltage and current.

4. The device of claim 1, wherein the rate is sufficient to capture at least one disturbance in the waveform of the respective property in the recorded sampled values.

5. The device of claim 4, wherein the at least one disturbance is a transient disturbance with a duration less than the period of the waveform.

6. The device of claim 4, wherein the at least one disturbance has a frequency.

7. The device of claim 6, wherein the waveform has a nominal frequency and the frequency of the at least one disturbance is greater than the nominal frequency.

8. The device of claim 6, wherein the frequency of the at least one disturbance is greater than 15 Hz.

9. The device of claim 4, wherein the at least one disturbance is a distortion of the waveform.

10. The device of claim 9, wherein the distortion is a DC offset, a harmonic, an interharmonic, a noise, or a notching.

11. The device of claim 1, wherein the sampler is a component of an application-specific integrated circuit (ASIC).

12. The device of claim 1, further comprising a communication receiver for receiving instructions to program the rate of the sampler.

13. The device of claim 1, further comprising a transmitter configured to transmit data to a remote server, a client device, or a mobile device.

14. The device of claim 13, wherein the transmitter is configured to transmit wirelessly to the remote server, the client device, or the mobile device over a communication network.

15. The device of claim 14, wherein the transmitter is a Wireless Fidelity (Wi-Fi) or a Bluetooth transmitter.

16. The device of claim 13, wherein the transmitter transmits at least a portion of the sampled values associated with the at least one clock signal in real-time to the remote server.

17. The device of claim 1, wherein the memory is removable from the device.

18. The device of claim 17, wherein the memory is configured to store sampled data over a period of at least one hour.

19. The device of claim 1, comprising a rechargeable battery.

20. The device of claim 1, wherein the device is configured to be supported by the wall socket.

21. The device of claim 1, wherein the device is configured to operate without further action by a user after coupling to the electrical grid through the wall socket.

22. A system for monitoring an electrical grid comprising:
a plurality of portable devices configured to connect to a plurality of respective wall sockets connected to an electrical grid, wherein each of the plurality of portable devices comprises:
an electrical connector for coupling to the electrical grid through a wall socket;
a detector for detecting at least one property of electricity provided by the electrical grid through the wall socket;
a receiver for receiving clock signals from a remote clock synchronization source through an antenna of the portable device; and
a sampler for sampling a respective detected property and recording sampled values in a memory, wherein the variation of the values with time represents a waveform of the respective property and the sampler samples at a rate of at least 50 kilo-samples-per-second to record variations of the property within a period of the waveform,
wherein each of the plurality of portable devices associates at least a portion of the sampled values with at least one clock signal; and
a server that communicates over a network with each of the plurality of portable devices to receive at least a respective portion of the sampled values associated with the at least one clock signal.

23. The system of claim 22, wherein the system aggregates received sampled values and associated clock signals by using the associated clock signals as markers to compare the sampled values received from one of the plurality of portable devices with the sampled values received from the others of the plurality of portable devices.

24. The system of claim 23, wherein the system detects a feature of the electrical grid by analyzing the aggregated sampled values.

25. The system of claim 24, wherein the system determines an area of the electrical grid affected by the feature.

26. The system of claim 25, wherein the system determines a location affected by the feature within the area of the grid.

27. The system of claim 24, wherein the system detects the feature within a low voltage portion of the electrical grid.

28. A method for monitoring the properties of an electrical grid comprising: at a portable electronic device:
receiving electricity from the electrical grid through a wall socket to which the portable electronic device is connected;
detecting at least one property of electricity provided by the electrical grid through the wall socket;
receiving at least one clock signal from a remote clock synchronization source through an antenna of the portable electronic device;
sampling a respective detected property and recording sampled values in a memory, wherein the variation of the values with time represents a waveform of the respective property and the respective detected property is sampled at a rate of at least 50 kilo-samples-per-second to record variations of the respective detected property within a period of the waveform; and
associating at least a portion of the sampled values with at least one clock signal.

* * * * *